(12) United States Patent
Wu

(10) Patent No.: US 12,137,478 B2
(45) Date of Patent: Nov. 5, 2024

(54) EFFICIENT MESSAGING IN A PROCEDURE FOR ACCESSING A COMMUNICATION CHANNEL

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 383 days.

(21) Appl. No.: 17/290,031

(22) PCT Filed: Jan. 31, 2020

(86) PCT No.: PCT/US2020/016037
§ 371 (c)(1),
(2) Date: Apr. 29, 2021

(87) PCT Pub. No.: WO2020/163160
PCT Pub. Date: Aug. 13, 2020

(65) Prior Publication Data
US 2021/0410191 A1 Dec. 30, 2021

Related U.S. Application Data

(60) Provisional application No. 62/801,429, filed on Feb. 5, 2019.

(51) Int. Cl.
*H04W 74/0833* (2024.01)
(52) U.S. Cl.
CPC .............. *H04W 74/0833* (2013.01)

(58) Field of Classification Search
CPC ................................. H04W 74/0833
See application file for complete search history.

(56) References Cited

U.S. PATENT DOCUMENTS

| 9,756,649 B2 | 9/2017 | He et al. |
| 10,405,342 B2 | 9/2019 | Wang et al. |

(Continued)

FOREIGN PATENT DOCUMENTS

| WO | WO-2018/183578 A1 | 10/2018 |
| WO | WO-2018/204863 A1 | 11/2018 |
| WO | WO-2019/195563 A1 | 10/2019 |

OTHER PUBLICATIONS

"On 2-step Random Access Procedure"; 3GPP TSG RAN WG1 Ad-Hoc Meeting 1901 R1-1901192 Taipei, Taiwan, Jan. 21-25, 2019; Nokia (Year: 2019).*

(Continued)

*Primary Examiner* — Benjamin H Elliott, IV
(74) *Attorney, Agent, or Firm* — MARSHALL, GERSTEIN & BORUN LLP

(57) ABSTRACT

Granting access to a communication channel for a user device by a base station includes receiving, from a user device, a request to access the communication channel, the request including a random access preamble and a payload, attempting to decode the payload, selecting a format of a response message in accordance with whether the payload was decoded successfully, and transmitting, to the user device, the response message, including providing an indication of the format of the response message to the user device.

14 Claims, 23 Drawing Sheets

(56) References Cited

U.S. PATENT DOCUMENTS

| | | | | |
|---|---|---|---|---|
| 2010/0202288 | A1* | 8/2010 | Park | H04W 74/008 370/230 |
| 2016/0374141 | A1* | 12/2016 | He | H04J 11/0023 |
| 2018/0103465 | A1* | 4/2018 | Agiwal | H04W 74/0833 |
| 2018/0124822 | A1* | 5/2018 | Wang | H04W 74/006 |
| 2018/0279186 | A1* | 9/2018 | Park | H04W 36/302 |
| 2018/0279375 | A1* | 9/2018 | Jeon | H04W 72/23 |
| 2018/0288810 | A1* | 10/2018 | Ishii | H04W 72/23 |
| 2019/0075598 | A1* | 3/2019 | Li | H04W 74/0833 |
| 2019/0132066 | A1* | 5/2019 | Park | H04W 36/08 |
| 2019/0132777 | A1* | 5/2019 | Park | H04B 7/088 |
| 2019/0132778 | A1* | 5/2019 | Park | H04W 24/10 |
| 2019/0335515 | A1* | 10/2019 | Chen | H04W 74/0858 |
| 2020/0100297 | A1* | 3/2020 | Agiwal | H04W 52/365 |
| 2020/0120713 | A1* | 4/2020 | Yerramalli | H04W 52/50 |
| 2020/0146069 | A1* | 5/2020 | Chen | H04W 52/362 |
| 2020/0154487 | A1* | 5/2020 | Shrivastava | H04W 72/23 |
| 2020/0252973 | A1* | 8/2020 | Zhang | H04W 74/0833 |
| 2020/0260485 | A1* | 8/2020 | Lei | H04W 24/08 |
| 2020/0260498 | A1* | 8/2020 | Xu | H04W 74/0833 |
| 2021/0410191 | A1* | 12/2021 | Wu | H04W 74/0833 |

OTHER PUBLICATIONS

"A scheme of fallback from 2-step RACH to 4-step RACH"; 3GPP TSG RAN WG1 Meeting #96 R1-1902918 Athens, Greece, Feb. 25-Mar. 1, 2019; CAICT (Year: 2019).*

"Procedures for Two-Step Rach"; 3GPP TSG-RAN WG1 Meeting #96 R1-1903321 Feb. 25-Mar. 1, 2019 Athens, Greece; Qualcomm (Year: 2019).*

"Summary of 7.2.1.2 Procedure for Two-step RACH"; 3GPP TSG RAN WG1 #96 R1-1903436 Athens, Greece, Feb. 25-Mar. 1, 2019; ZTE (Year: 2019).*

"2-step RACH resource assignment and fall-back operation for NR-U"; 3GPP TSG-RAN WG2 Meeting #104 R2-1817192 Spokane, USA, Nov. 12-16, 2018; Nokia (Year: 2018).*

"Fallback for 2-step Ra"; 3GPP TSG-RAN WG2 #105bis TDoc R2-1903427 Xi'an, China, Apr. 8-Apr. 12, 2019; Ericsson (Year: 2019).*

"Fall back procedure from 2-step RACH to 4-step Rach"; 3GPP TSG RAN-WG2 Meeting #105bis R2-1903715 Xian, China, Apr. 8-12, 2019; Nokia (Year: 2019).*

"Fall back to 4 step RACH procedure"; 3GPP TSG-RAN WG2 #105bis R2-1904071 Xi'an, China, Apr. 8-12, 2019; NEC (Year: 2019).*

"RACH type switching between 2-steps, 4-steps RACH and CFRA"; 3GPP TSG-RAN WG2 Meeting 105bis R2-1904112 Xian, China, Apr. 8-Apr. 12, 2019; Huawei (Year: 2019).*

"Consideration on fall back procedure from 2-step RACH to 4-step RACH"; 3GPP TSG RAN WG2 Meeting #105bis R2-1904210 Xi'an, China, Apr. 8-Apr. 12, 2019; Sony (Year: 2019).*

"Discussion on RACH resources and fallback from 2-step to 4-step random access"; 3GPP TSG-RAN WG2 #105bis R2-1904324 Xi'an, China, Apr. 8-Apr. 12, 2019; CMCC (Year: 2019).*

"two-step RACH fall back to four-step Rach"; 3GPP TSG-RAN WG2 Meeting #105bis R2-1904971 Xi'an, China, Apr. 8-12, 2019; Qualcomm (Year: 2019).*

LTE; Evolved Universal Terrestrial Radio Access (E-UTRA); Medium Access Control (MAC) protocol specification (3GPP TS 36.321 version 13.3.0 Release 13); ETSI TS 136 321 V13.3.0 (Oct. 2016); Oct. 2016 (Year: 2016).*

First Examination Report for India Application No. 202147021022, dated Feb. 22, 2022.

Office Action for European Patent Application No. 20708944.2, dated Jan. 25, 2023.

Office Action for Chinese Application No. 202080008049.5, dated Nov. 30, 2023.

"3rd Generation Partnership Project; Technical Specification Group Radio Access Network; NR; Medium Access Control (MAC) protocol specification (Release 15)", 3GPP Draft (Jan. 11, 2019).

Office Action for European Application No. 20708944.2, dated Sep. 14, 2023.

International Search Report and Written Opinion for Application No. PCT/US2020/016037, dated May 6, 2020.

LG Electronics Inc., "2-Step RACH Procedure for NR-U," 3GPP Draft, 3rd Generation Partnership Project (3GPP), Mobile Competence Centre (2018).

Mediatek Inc. "2-Step RACH msgA and msgB Contents," 3GPP Draft, 3rd Generation Partnership Project (3GPP), Mobile Competence Centre (2018).

Oppo, "Fall Back Mechanism for 2-Steps RACH," 3GPP TSG-RAM Wg Meeting #105bis (2019).

Vivo, "RAN2 Impacts of 2-Step RACH," 3GPP Draft, 3rd Generation Partnership Project (3GPP), Mobile Competence Centre (2018).

ZTE Corporation, "Consideration on 2-Step RACH Procedure," 3GPP TSG-WG2 Meeting #105-bis (2019).

* cited by examiner

| R/LCID or R/F/LCID/L | RAR |
|---|---|

First MAC subheader

Figure 9

| R | R | R | RAPID | |
|---|---|---|---|---|
| RAPID | Timing Advance Command | | | |
| Timing Advance Command | | | UL Grant | |
| UL Grant | | | | |
| UL Grant | | | | |
| UL Grant | | | | |
| Temporary C-RNTI | | | | |
| Temporary C-RNTI | | | | |

Figure 10

EFFICIENT MESSAGING IN A PROCEDURE FOR ACCESSING A COMMUNICATION CHANNEL

CROSS-REFERENCE TO RELATED APPLICATIONS

This present application is the U.S. National Phase of International Patent Application No. PCT/US20/16037, filed Jan. 31, 2020, which claims priority to U.S. Provisional Patent Application No. 62/801,429 entitled "Efficient Messaging in a Procedure for Accessing a Communication Channel," filed on Feb. 5, 2019, the entire disclosure of which is hereby expressly incorporated by reference. The priority application is hereby incorporated by reference in its entirety.

FIELD OF THE DISCLOSURE

This disclosure relates to wireless communications and, more particularly, to synchronizing wireless communications in a channel access procedure.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

To synchronize communication over a radio interface in an unlicensed portion of the radio spectrum, a user device (referred to as user equipment, or "UE") and a base station can use a random access channel (RACH) procedure, for example. Some standards define two types of RACH procedures: a two-step procedure and a four-step procedure. In the four-step procedure as shown in FIG. 2, (1) a user device sends 202 a random access preamble to the base station (also referred to herein as "Msg1"); (2) the base station sends 204 a random access response (RAR) to the user device (also referred to herein as "Msg2"); (3) the user device sends 206 a scheduled transmission to the base station (also referred to herein as "Msg3"); and (4) the base station sends 208 a contention resolution to the user device (also referred to herein as "Msg4"). The two-step procedure as shown in FIG. 3, condenses steps (1) and (3) into a first step and steps (2) and (4) into a second step, such that (1) a user device sends 302 a random access preamble and a scheduled transmission to the base station (also referred to herein as "MsgA"); and (2) the base station sends 304 an RAR and contention resolution to the user device (also referred to herein as "MsgB").

In some scenarios, a user device sends a message to the base station including a random access preamble and a payload in accordance with the two-step procedure. If the base station fails to decode the payload, the base station may transmit only an RAR to the user device instead of a message including both the RAR and contention resolution. However, the user device does not know whether the base station transmitted the RAR or MsgB (i.e., a combination of the RAR and contention resolution) and may fail to decode the transmission from the base station according to the appropriate procedure.

SUMMARY

Generally speaking, the techniques of this disclosure allow a user device to determine, during a channel access procedure, which communication scheme the base station is following, and whether the base station needs additional information from the user device. In some implementations, the channel access communications are RACH transmissions from the base station. The user device determines how to decode the RACH transmissions based on whether the base station generates the RACH transmissions according to a two-step or four-step RACH procedure format (i.e., whether the base station is using a format that includes an RAR and a resolution or a format that does not include the resolution). More specifically, in response to receiving an RACH communication from a user device, a base station attempts to decode the payload of the RACH communication. If the base station fails to decode the payload, the base station may determine to proceed with the four-step RACH procedure. To make the user device aware of the switch to the four-step RACH procedure, in a response to the RACH communication sent to the user device, the base station includes an indication to fall back to the four-step RACH procedure. The indication may be the presence of a first radio network temporary identifier (RNTI) in the response, where the user device associates the first RNTI with a switch to the four-step RACH procedure. In other implementations, the indication may be included in a media access control (MAC) layer packet data unit (PDU) or in a downlink control information (DCI) element. In yet other implementations, the response to the RACH communication may include an indication of the size of a portion of the response in the DCI, such as the size of the MAC PDU. If the size is less than a threshold size, the user device may decode the MAC PDU according to the four-step RACH procedure format or the format that does not include a resolution.

On the other hand, if the base station successfully decodes the payload, the base station may determine to proceed with the two-step RACH procedure. To make the user device aware that the base station is responding in the two-step RACH procedure format, in the response to the RACH communication sent to the user device, the base station includes an indication to proceed with the two-step RACH procedure. The indication may be the presence of a second RNTI, where the user device associates the second RNTI with the two-step RACH procedure. In other implementations, the indication may be included in the MAC PDU or in the DCI. In yet other implementations, the response to the RACH communication may include an indication of the size of a portion of the response in the DCI, such as the size of the MAC PDU. If the size is greater than or equal to the threshold size, the user device may decode the MAC PDU according to the two-step RACH procedure format or the format that includes an RAR and a resolution.

One example embodiment of these techniques is a method in a base station for granting access to a communication channel. The method includes receiving, by processing hardware at the base station from a user device, a request to access the communication channel, the request including a random access preamble and a payload, and attempting to decode, by the processing hardware, the payload. The method further includes selecting, by the processing hardware, a format of a response message in accordance with whether the payload was decoded successfully, and transmitting, by the processing hardware to the user device, the response message, including providing an indication of the format of the response message to the user device.

Another embodiment of these techniques is a base station comprising processing hardware configured to implement the method above.

Yet another embodiment of these techniques is a method in a user device for requesting access to a communication channel. The method includes transmitting, by processing hardware at the user device to a base station, a request to access the communication channel, the request including a random access preamble and a payload, and receiving, by the processing hardware from the base station, a response message to the request, the response message indicating a format of the response message in accordance with whether the payload was decoded successfully by the base station. The method further includes determining, by the processing hardware, the format of the response message, and decoding, by the processing hardware, a portion of the response message according to the determined format.

Still another embodiment of these techniques is a user device comprising processing hardware configured to implement the method above.

BRIEF DESCRIPTION OF THE DRAWINGS

FIG. 9 illustrates an example format of a MAC subPDU within a MAC PDU in the response message including a first MAC subheader and an RAR;

FIG. 10 illustrates another example format of an RAR included in the MAC PDU of FIG. 9;

DETAILED DESCRIPTION OF THE DRAWINGS

Figure 1:
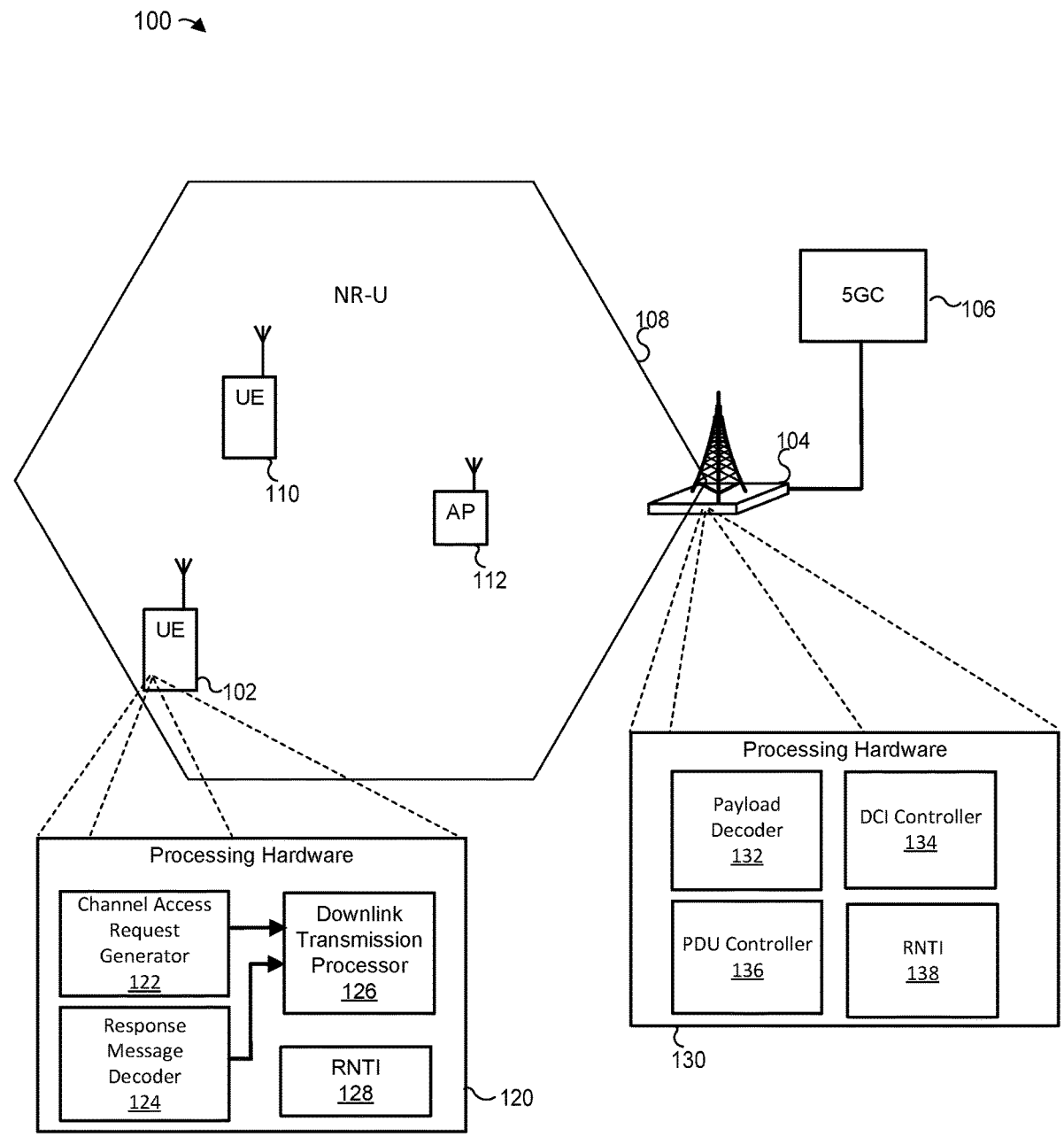
FIG. 1 is a block diagram of an example wireless communication network in which a base station and a user device can handle channel access procedures in accordance with the techniques of this disclosure.
Figure 2:
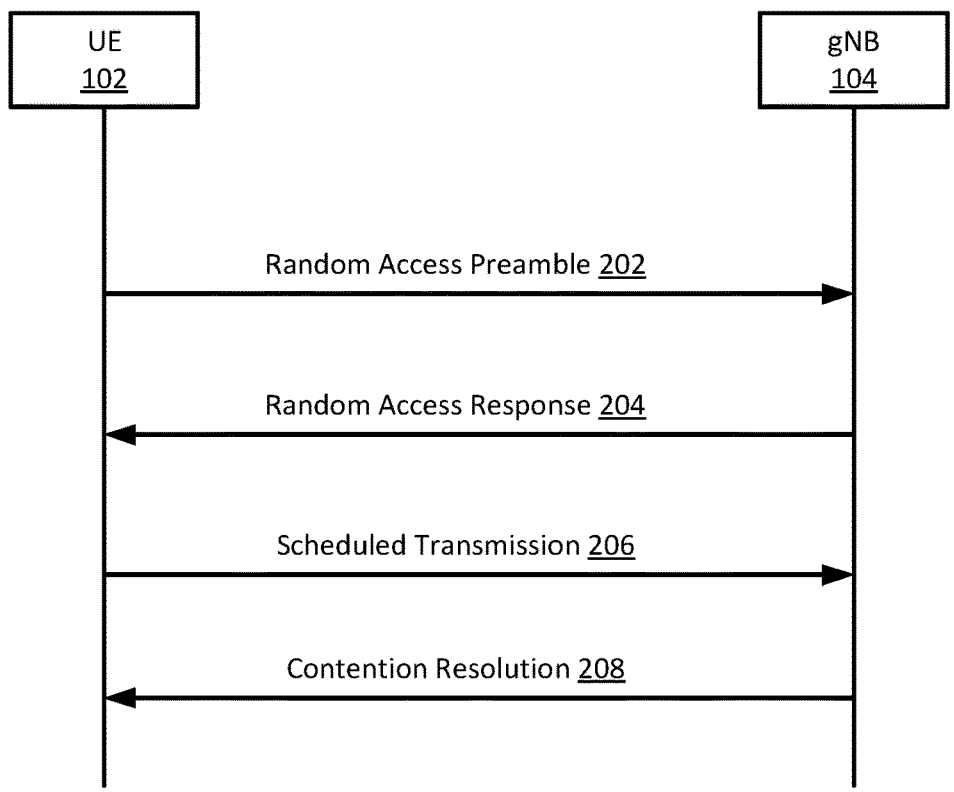
FIG. 2 is a messaging diagram of an example four-step RACH procedure.
Figure 3:
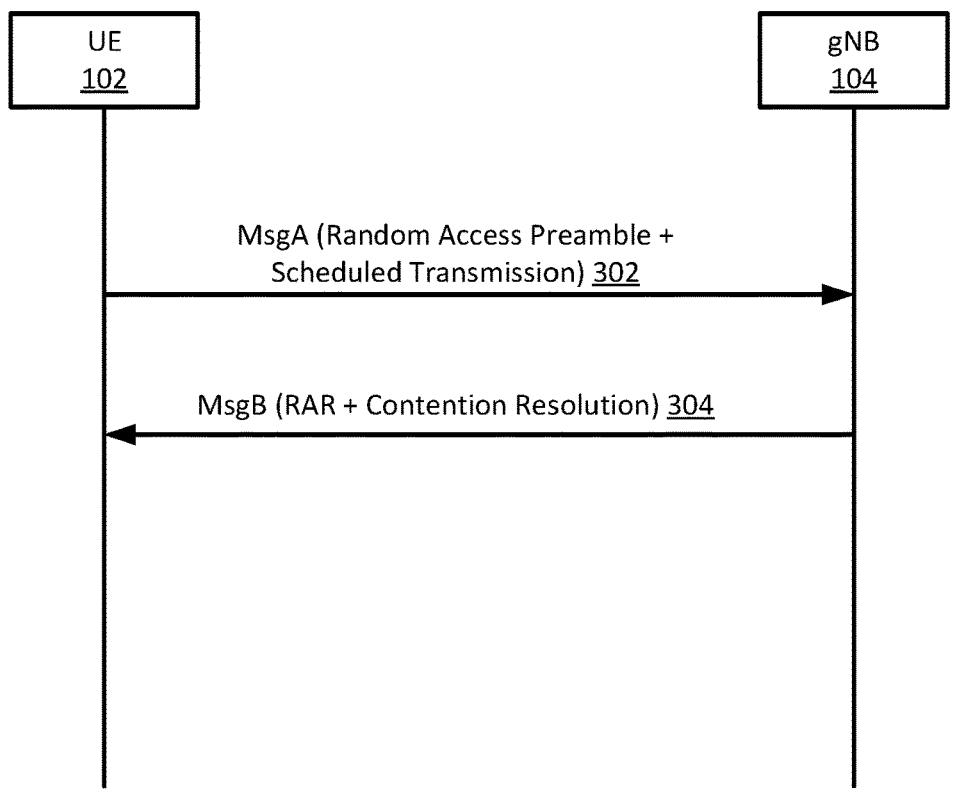
FIG. 3 is a messaging diagram of an example two-step RACH procedure.

FIG. 1 depicts an example wireless communication network 100 in which devices such as base stations and user devices (also referred to user equipment, or UEs) communicate using channel access procedures on unlicensed portions of the radio spectrum. Because the examples below refer primarily to 5G NR technologies, these unlicensed portions of the radio spectrum are referred to as NR-U.

The wireless communication network 100 in an example configuration includes a UE 102, which can be any suitable device capable of wireless communications (as further discussed below). The wireless communication network 100 further includes a 5G New Radio (NR) base station 104 connected to a core network (CN) 106 of CN type 5GC. The 5G NR base station 104 accordingly operates as a g Node B (gNB). In other implementations, however, the wireless communication network 100 can include one or more base stations that operate according to radio access technologies (RATs) of types other than NR, and these base stations can be connected to CNs of other CN types, or operated in a standalone mode without a connection to any CN. Accordingly, devices operating using any RAT can implement the techniques of this disclosure when attempting to obtain radio resources in an unlicensed spectrum.

The base station 104 covers a 5G NR cell 108 in which UEs can utilize the NR-U as well as portions of the radio spectrum allocated specifically to the service provider that operates the base station 104 and the core network 106. When receiving data from, and transmitting data to, the base station 104 using the 5G NR air interface, the UE 102 may share the NR-U with other devices. For example, a UE 110 can be a subscriber of the service provider that operates the base station 104 and the core network 106, and thus can communicate with the base station 104. In another scenario, the UE 110 is a subscriber of another service provider that supports the NR-U and communicates with a base station other than the base station 104 (not shown to avoid clutter). In this scenario, a user operates the base station 104 and connects the base station 104 to a data network of an Internet service provider (ISP). The base station 104 in this case operates similar to a WiFi access point (AP) but utilizes the NR-U instead of one of IEEE 802.11 standards to communicate with the UEs. Further, an AP 112 can utilize portions of the radio spectrum as the NR-U when operating in a wireless local area network (WLAN) according to one of IEEE 802.11 standards.

In general, the wireless communication network 100 can include any number of base stations, and each of the base stations can cover one, two, three, or any other suitable number of cells. Additionally, the wireless communication network 100 can include any number of UEs 102.

The UE 102 is equipped with processing hardware 120 that can include one or more general-purpose processors (e.g., CPUs) and a non-transitory computer-readable memory storing instructions that the one or more general-purpose processors execute. Additionally or alternatively, the processing hardware 120 can include special-purpose processing units. The processing hardware 120 in an example implementation includes a channel access request generator 122, a response message decoder 124, and a downlink transmission processor 126.

The channel access request generator 122 may generate a MsgA having a random access preamble and a payload. In some implementations, the payload in the MsgA is a MAC PDU. The payload may include an uplink common control channel (CCCH) message having an RRC request message (e.g., an RRC Setup Request message, an RRC Resume Request message, an RRC Reestablishment Request message, or an RRC Early Data Request message). In other implementations, the payload may include an Internet Protocol (IP) packet. The MAC PDU may include an RRC request message, a MAC control element (CE), a radio link control (RLC) PDU, a Packet Data Convergence Protocol (PDCP) PDU or a Service Data Adaptation Protocol (SDAP) PDU. The base station 104 may provide a response message to the MsgA including a DCI on a physical downlink control channel (PDCCH), and a MAC PDU in a physical data shared channel (PDSCH). Then the response message decoder 124 may decode the response message by obtaining the DCI. When the response message decoder 124 successfully obtains the DCI, the downlink transmission processor 126 can receive a PDSCH transmission including the MAC PDU according to the DCI. The response message decoder 124 may then decode the MAC PDU according to a format indicated by the DCI, the RNTI, or the MAC PDU. For example, the DCI, RNTI, or MAC PDU may indicate that the MAC PDU is in a first format having an RAR. Accordingly, the response message decoder 124 may decode the MAC PDU using the first format. In another example, the DCI, RNTI, or MAC PDU may indicate that the MAC PDU is in a second format having a MsgB. Accordingly, the response message decoder 124 may decode the MAC PDU using the second format.

The memory of the processing hardware 120 also can store an RNTI 128 of the UE 102. The RNTI can be for example a cell RNTI (C-RNTI), a temporary C-RNTI, a random access RNTI (RA-RNTI), a system information RNTI (SI-RNTI), a paging RNTI (P-RNTI), a configured scheduling RNTI (CS-RNTI), etc. The UE 102 can attempt to decode a PDCCH using the RNTI 128. The base station 104 may transmit to the UE 102 one or more MAC PDUs in a PDSCH. The one or more MAC PDUs may include one or more MAC control elements. The UE 102 can store multiple RNTIs of different types and utilize these RNTIs when processing different messages as discussed below.

Processing hardware 130 of the base station 104 also can include one or more general-purpose processors such as CPUs and a non-transitory computer-readable memory storing instructions that the one or more general-purpose processors execute. Additionally or alternatively, the processing hardware 130 can include special-purpose processing units. The processing hardware in an example implementation includes a payload decoder 132, a DCI controller 134, a PDU controller 136, and an RNTI generator 138. In other implementations, the processing hardware 130 includes only some of the units 132-138.

In operation, the payload decoder 132 attempts to decode the payload included in the MsgA from the UE 102. If the payload decoder 132 is unable to successfully decode the payload, the payload decoder 132 may provide an indication to the DCI controller 134, the PDU controller 136, and/or the RNTI generator 138 to generate a first DCI, first PDU, or first RNTI indicating to the UE 102 to decode the MAC PDU in a first format having an RAR. If the payload decoder 132 successfully decodes the payload, the payload decoder 132 may provide an indication to the DCI controller 134, the PDU controller 136, and/or the RNTI generator 138 to generate a second DCI, second PDU, or second RNTI indicating to the UE 102 to decode the MAC PDU in a second format having a MsgB.

The DCI controller 134 generates a DCI to be transmitted to the UE 102 via a PDCCH. In some implementations, the DCI is generated so that the UE 102 obtains the information necessary to decode information on the PDSCH. For example, when the DCI controller 134 generates a first DCI, the UE 102 determines to decode a MAC PDU transmitted on the PDSCH in a first format having an RAR. When the DCI controller 134 generates a second DCI different from the first DCI, the UE 102 determines to decode the MAC PDU transmitted on the PDSCH in a second format having a MsgB. The first and second DCIs are described in more detail below.

The PDU controller 136 generates a MAC PDU to be transmitted to the UE 102 via a PDSCH. In some implementations, the generated MAC PDU indicates the format for the UE 102 to decode the MAC PDU. For example, when the PDU controller 136 generates a first MAC PDU having a first MAC subheader, the UE 102 determines to decode the MAC PDU in a first format having an RAR. When the PDU controller 136 generates a second MAC PDU having a second MAC subheader different from the first MAC subheader, the UE 102 determines to decode the MAC PDU transmitted on the PDSCH in a second format having a MsgB. The first and second MAC PDUs and first and second MAC subheaders are described in more detail below.

The RNTI generator 138 generates an RNTI which is used to scramble the DCI to be transmitted to the UE 102 via a PDCCH. In some implementations, the RNTI is generated so that the UE 102 obtains the information necessary to decode information on the PDSCH. For example, when the RNTI generator 138 generates a first RNTI, the UE 102 determines to decode a MAC PDU transmitted on the PDSCH in a first format having an RAR. When the RNTI generator 138 generates a second RNTI different from the first RNTI, the UE 102 determines to decode the MAC PDU transmitted on the PDSCH in a second format having a MsgB. For example, the RNTI generator 138 may generate the first RNTI based on characteristics of a physical random access channel (PRACH) in which the MsgA is transmitted. The RNTI generator 138 may generate the second RNTI as the RNTI included in the payload of the MsgA transmitted by the UE 102. In another example, the RNTI generator 138 may generate the second RNTI based on a UE identifier (ID) associated with the UE 102. In yet another example, the RNTI generator 138 may generate the second RNTI based on other characteristics of the PRACH in which the MsgA is transmitted. The first and second RNTIs are described in more detail below.

As described above, during a channel access procedure, the UE 102 sends a MsgA to the base station 104 which includes a random access preamble and a payload. The base station 104 then attempts to decode the payload. If the base station 104 fails to decode the payload, the base station 104 may provide a response to the UE 102 in a first format. For example, the base station 104 may provide an RAR to the UE 102 without a resolution, as in the four-step RACH procedure. On the other hand, if the base station 104 successfully decodes the payload, the base station 104 may provide a response to the UE 102 in a second format. For example, the base station 104 may provide both an RAR and a resolution to the UE 102, as in the two-step RACH procedure. In some implementations, the base station 104 provides an indication of the format for decoding the response message to the UE 102 using an RNTI.

Figure 4A:
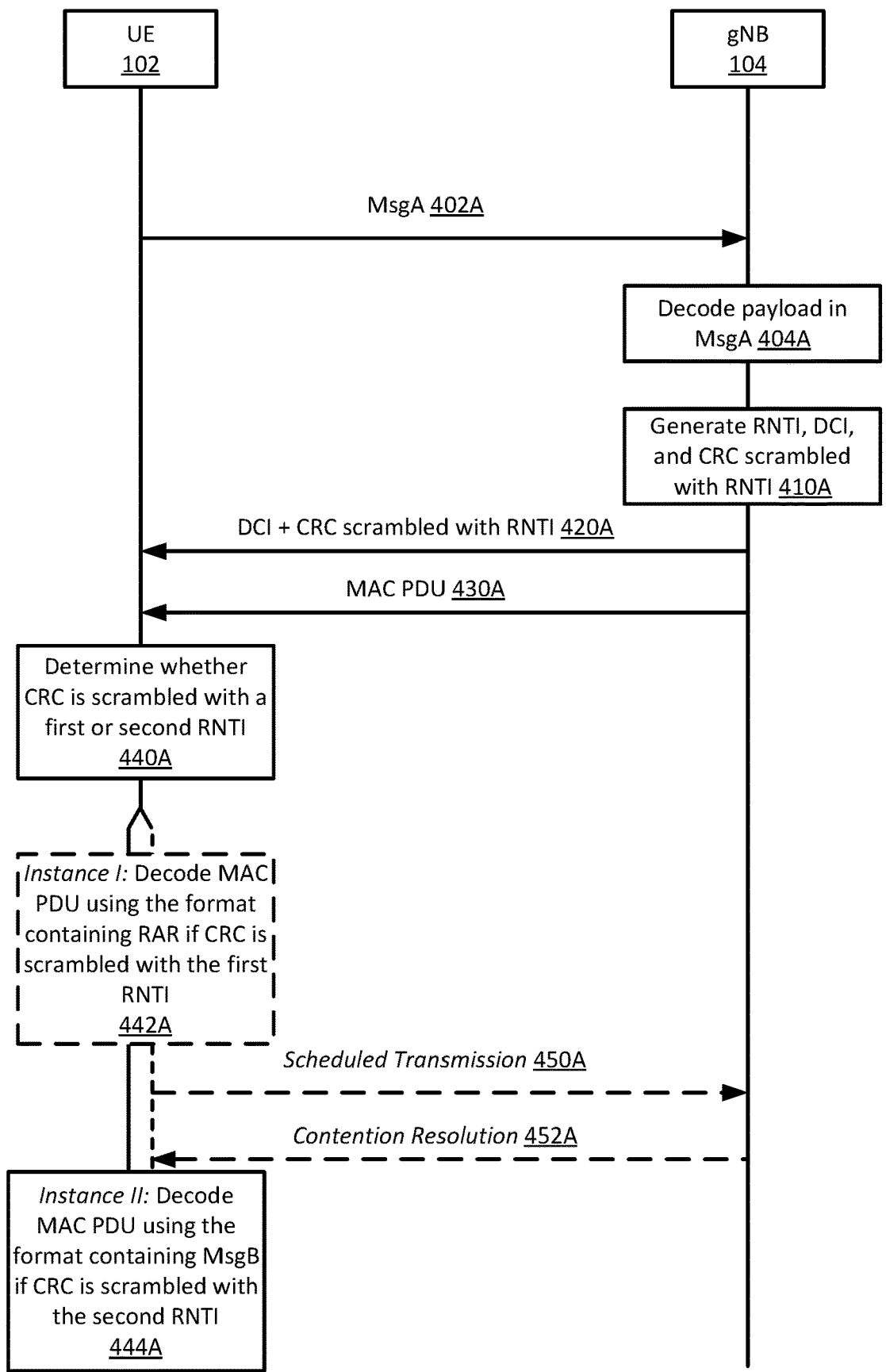
FIG. 4A is a messaging diagram of an example procedure for signaling to the user device a format in which to decode a response message from the base station using a radio network temporary identifier (RNTI)

FIG. 4A illustrates a messaging diagram of an example procedure for signaling to the user device a format in which to decode a response message from the base station using an RNTI. UE 102 sends 402A a MsgA to the base station 104 including a random access preamble and a payload. Then, the base station 104 attempts to decode 404A the payload. If the base station 104 detects a preamble in the MsgA but fails to decode the payload, the base station 104 generates an RAR instead of a MsgB, a MAC subheader for the RAR, and a MAC PDU including the MAC subheader and the RAR. The MAC subheader may include extension (E), type (T), and/or random access preamble identifier (RAPID) fields.

To indicate the format of the response message, the base station 104 applies a first identifier of the UE 102 to the response message when the payload was not decoded successfully, in a first instance, and applies a second identifier of the UE 102 to the response message when the payload was decoded successfully, in a second instance. More specifically, to transmit the MAC PDU, the base station 104 generates a first RNTI and a DCI and scrambles the DCI with the first RNTI. In some implementations, the base station 104 scrambles 410A a CRC of the DCI with the first RNTI. In one example, the first RNTI may be a first identifier of the UE 102 and is assigned to the UE 102 by the base station 104. In another example, the first RNTI is an RA-RNTI. The base station 104 calculates the RA-RNTI according to time and frequency resources of the MsgA or the preamble in the MsgA as described in more detail below. Then the base station 104 transmits 420A the DCI and the CRC scrambled with the first RNTI on a PDCCH to the UE 102. The base station also transmits 430A the MAC PDU to the UE 102 on physical resources, a transport block, or a PDSCH indicated in the DCI.

On the other hand, if the base station 104 detects the preamble in the MsgA and successfully decodes the payload, the base station 104 generates a MAC PDU including a MsgB. In some implementations, the MsgB includes one or more fields in the RAR, one or more MAC control elements (CEs), one or more new fields (not included in the RAR), or at least one MAC service data unit (SDU). The MAC SDU may include a radio link control RLC PDU or an RRC response message (e.g., an RRC Setup message, an RRC Resume message or an RRC Reestablishment message).

In one example, the base station 104 may include at least some of the following information in a MsgB if the base station 104 receives a MsgA from the UE 102: a C-RNTI, a timing advance (TA) command, a contention resolution identity (ID), a downlink (DL) grant, and/or a MAC SDU. The size of the C-RNTI may be 16 bits, and the size of the TA command may be 12 bits. If an uplink CCCH message is included in the payload of MsgA, the contention resolution ID may be 48 bits. The base station 104 may generate the contention resolution ID from the CCCH message (e.g., including a RRC Setup Request, a RRC Resume Request or a RRC Reestablishment Request or a RRC Early Data Request message). For example, the base station 104 includes the first 48 bits of the uplink CCCH message in the contention resolution ID if the base station 104 determines to include the contention resolution ID in the MsgB or the MAC PDU containing the MsgB. The size of the DL grant may be 27 bits. However, the DL grant may not be needed if the MAC SDU is included in the MsgB. The MAC SDU may be a fixed or variable size and may not be included if the DL grant is included in the MsgB. The DL grant may also be referred to as a DL assignment.

To transmit the MAC PDU, the base station 104 generates a second RNTI and DCI, and scrambles the DCI with the second RNTI. In some implementations, the base station 104 scrambles 410A a CRC of the DCI with the second RNTI. In one example, the second RNTI may be a second identifier of the UE 102 and is assigned to the UE 102 by the base station 104. In another example, the base station 104 calculates the second RNTI according to time and frequency resources of the MsgA as described in more detail below. Then the base station 104 transmits 420A the DCI and the CRC scrambled with the second RNTI on a PDCCH to the UE 102. The base station also transmits 430A the MAC PDU to the UE 102 on physical resources, a transport block, or a PDSCH indicated in the DCI.

The UE 102 then determines whether the response includes the first RNTI or the second RNTI by using the first and second RNTIs. The UE 102 may use the assigned first RNTI or may calculate the first RNTI according to time and frequency resources of the MsgA or the preamble in the MsgA as described in more detail below. The UE 102 may use the assigned second RNTI or may calculate the second RNTI according to time and frequency resources of the MsgA as described in more detail below. The UE 102 then monitors PDCCH in one or more PDCCH occasions. If the UE 102 receives the DCI and the CRC scrambled with the RNTI in a PDCCH occasion, the UE 102 determines 440A whether the CRC is scrambled with the first or the second RNTI. The UE 102 identifies the DCI and obtains a PDSCH including the MAC PDU according to the DCI. Then the UE 102 decodes the MAC PDU using the format indicated by the RNTI. There are different implementations to determine or verify that the CRC is scrambled with the first or the second RNTI. In one implementation, the UE 102 calculates 440A a CRC from the DCI and scrambles the CRC with the first RNTI. If the CRC scrambled with the first RNTI is identical to the CRC scrambled with the RNTI, the UE 102 determines the received CRC is scrambled with the first RNTI. Additionally, the UE 102 calculates a CRC from the DCI and scrambles the CRC with the second RNTI. If the CRC scrambled with the second RNTI is identical to the CRC scrambled with the RNTI, the UE 102 determines the received CRC is scrambled with the second RNTI. In another implementation, the UE 102 calculates a CRC from the DCI. The UE 102 uses the first RNTI to descramble the CRC scrambled with the RNTI. If the calculated CRC is identical to the descrambled CRC, the UE 102 determines the received CRC is scrambled with the first RNTI. Furthermore, the UE 102 uses the second RNTI to descramble the CRC scrambled with the RNTI. If the calculated CRC is identical to the descrambled CRC, the UE 102 determines the received CRC is scrambled with the second RNTI.

More specifically, in a first instance if the CRC is scrambled with the first RNTI, the UE 102 decodes 442A the MAC PDU using the format of the MAC PDU including an RAR without a resolution. The UE 102 may identify the RAR from the first MAC subheader. Then the UE 102 proceeds to provide 450A additional information to the base station 104, such as a payload/scheduled transmission as in the four-step RACH procedure. In response, the base station 104 transmits 450A a contention resolution to the UE 102.

In a second instance, if the CRC is scrambled with the second RNTI, the UE 102 decodes 444A the MAC PDU using the format of the MAC PDU including MsgB (e.g., RAR with a resolution). The UE 102 may identify the MsgB according to the corresponding MAC subheaders.

Figure 4B:
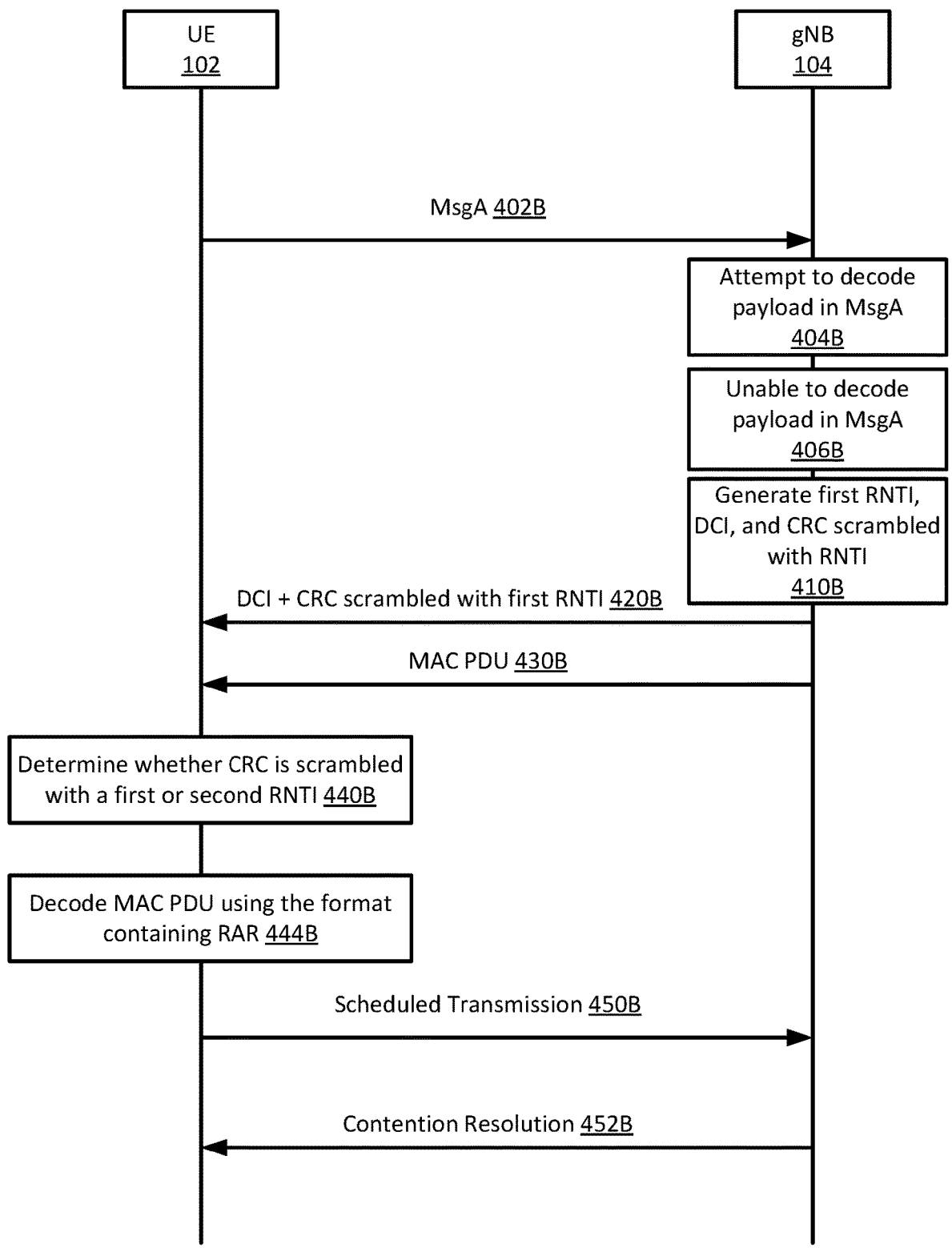
FIG. 4B is a messaging diagram for signaling to the user device a first format in which to decode a response message from the base station using a first RNTI.

FIG. 4B illustrates a detailed messaging diagram of the example procedure illustrated in FIG. 4A when the base station 104 is unable to decode the payload from the UE 102. The UE 102 sends 402B a MsgA to the base station 104 including a random access preamble and a payload. Then, the base station 104 attempts to decode 404B the payload. The base station 104 detects a preamble in the MsgA but fails to decode 406B the payload. As a result, the base station 104 generates an RAR instead of a MsgB, a first MAC subheader for the RAR, and a MAC PDU including the first MAC subheader and the RAR. In some implementations, the RAR includes at least some of: a reserved bit, one or more TA commands, one or more uplink (UL) grants, or one or more temporary C-RNTIs.

To transmit the MAC PDU, the base station 104 generates 410B a first RNTI, DCI, and a CRC of the DCI scrambled with the first RNTI. In some implementations, the first RNTI may be associated with the PRACH in which the MsgA is transmitted. The PRACH includes physical resources in which the MsgA is transmitted and can be divided into a first part and a second part. The first part of the PRACH includes first physical resources in which the preamble of the MsgA is transmitted and the second part of the PRACH includes second physical resources in which the payload is transmitted. The first RNTI may be generated (or computed) as:

The first RNTI=1+$s\_id$+14×$t\_id$+14×80×$f\_id$+14× 80×8×$ul\_carrier\_id$, where:

$s\_id$ is the index of the first orthogonal frequency-division multiplexing (OFDM) symbol of the PRACH (0≤$s\_id$<14), $t\_id$ is the index of the first slot of the PRACH in a system frame (0≤$t\_id$<80), $f\_id$ is the index of the first part of the PRACH in the frequency domain (0≤$f\_id$<8), and $ul\_carrier\_id$ is the UL carrier used for MsgA transmission (0 for NUL carrier, and 1 for SUL carrier). The first RNTI may be a RA-RNTI.

The base station 104 then transmits 420B the DCI and the CRC scrambled with the first RNTI on a PDCCH to the UE 102. The base station 104 also transmits 430B the MAC PDU to the UE 102 on physical resources, a transport block, or a PDSCH indicated in the DCI. The UE 102 then identifies whether the response includes the first RNTI or the second RNTI by using both the first and second RNTIs. For example, the UE 102 may obtain or generate the first RNTI using the equation described above. The UE 102 then monitors PDCCH in one or more PDCCH occasions and determines 440B whether the CRC is scrambled with the first or the second RNTI. More specifically, the UE 102 may attempt to verify the CRC with the first RNTI and the DCI as described previously. If the UE 102 successfully verifies the CRC with the first RNTI and the DCI, the UE 102 may determine that the CRC is scrambled with the first RNTI. If the UE 102 does not successfully decode the CRC with the first RNTI, the UE 102 may attempt to verify the CRC with the second RNTI. If the UE 102 successfully verifies the CRC with the second RNTI, the UE 102 may determine that the CRC is scrambled with the second RNTI.

In any event, the UE 102 identifies the DCI and obtains a PDSCH including the MAC PDU according to the DCI. Then the UE 102 decodes the MAC PDU using the format indicated by the RNTI. More specifically, because the CRC is scrambled with the first RNTI, the UE 102 decodes 448B the MAC PDU using the format of the MAC PDU including an RAR without a resolution. The UE 102 may identify the RAR from the first MAC subheader. Then the UE 102 proceeds to provide 450B additional information to the base station 104, such as a payload/scheduled transmission as in the four-step RACH procedure. In response, the base station 104 transmits 452B a contention resolution to the UE 102.

Figure 4C:
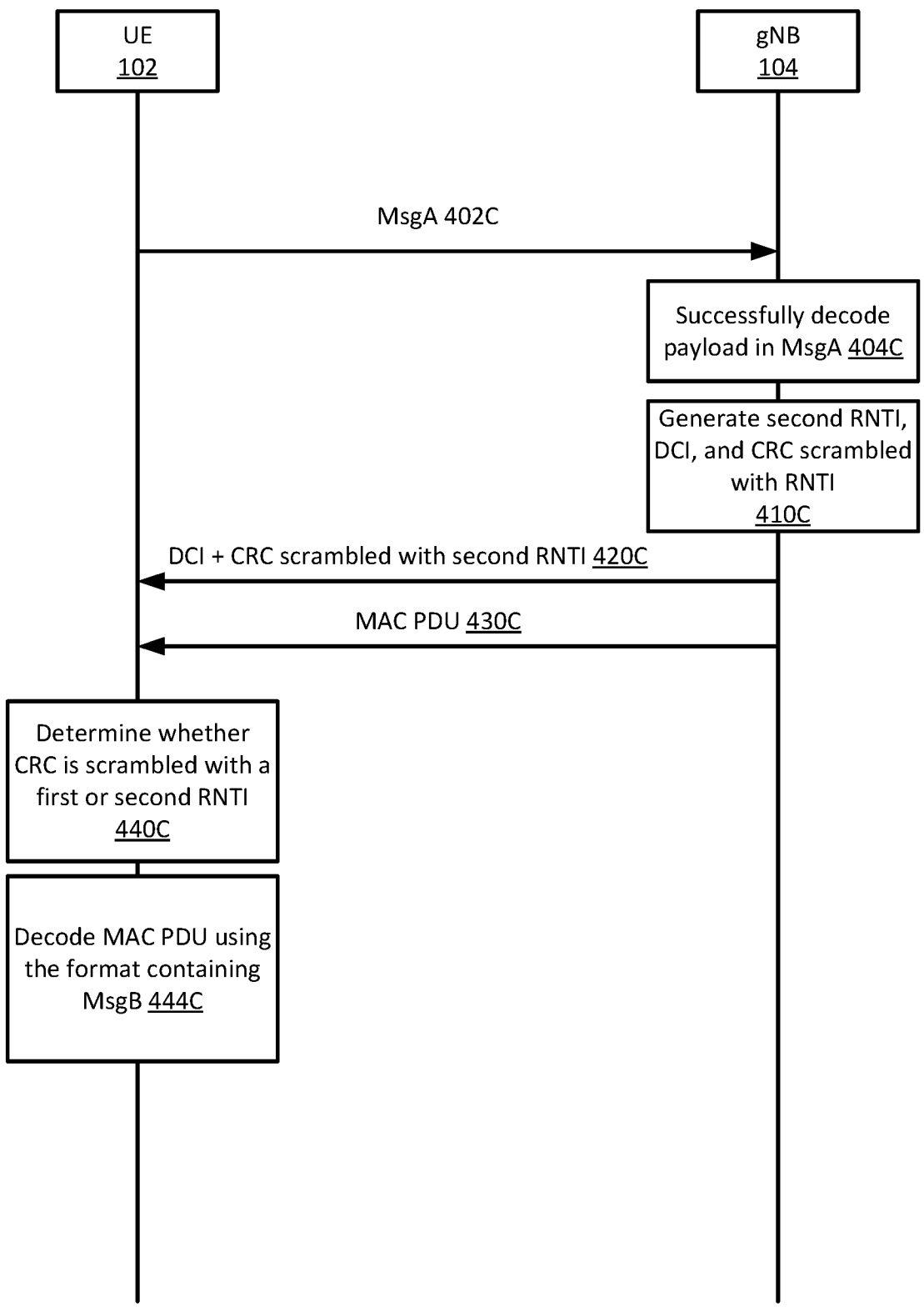
FIG. 4C is a messaging diagram for signaling to the user device a second format in which to decode a response message from the base station using a second RNTI.

FIG. 4C illustrates a detailed messaging diagram of the example procedure illustrated in FIG. 4A when the base station 104 successfully decodes the payload from the UE 102. The UE 102 sends 402C a MsgA to the base station 104 including a random access preamble and a payload. Then, the base station 104 detects a preamble in the MsgA and successfully decodes 404C the payload. As a result, the base station 104 generates a MAC PDU including a MsgB. In some implementations, the MsgB includes one or more fields in the RAR, one or more MAC CEs, one or more new fields (not included in the RAR), or at least one MAC SDU. In some implementations, the base station 104 may generate the MAC PDU which includes a MAC subheader having a reserved (R) field, a format (F) field, a logical channel identity (LCID) field, and/or a length (L) field, and the MsgB. To transmit the MAC PDU, the base station 104 generates 410C a second RNTI which has a different value from the first RNTI, DCI, and a CRC of the DCI scrambled with the second RNTI.

In some implementations, the UE 102 includes the second RNTI in the payload in the MsgA. For example, the second RNTI may be a C-RNTI which was assigned by the base station 104 or another base station 104 to the UE 102. In other implementations, the UE 102 includes a UE identity (ID) in the MsgA. The base station 104 then generates, derives, or calculates the second RNTI from the UE ID. For example, the second RNTI may be equal to an output of a function with the UE ID as the input of the function, i.e., the second RNTI=function (the UE ID). The function can be a hash function or a modulo operation. In yet other implementations, the second RNTI may be associated with the PRACH in which the MsgA is transmitted. In one example, the second RNTI may be generated (or computed) as:

The second RNTI=1+$s\_id$+14×$t\_id$+14×80×$f\_id$+14× 80×8×ul_carrier_id, where:

$s\_id$ is the index of the M-th OFDM symbol of the PRACH (0≤$s\_id$<14), $t\_id$ is the index of the N-th slot of the PRACH in a system frame (0≤$t\_id$<80), $f\_id$ is the index of the first part of the PRACH in the frequency domain (0≤$f\_id$<8), and ul_carrier_id is the UL carrier used for the MsgA transmission (0 for NUL carrier, and 1 for SUL carrier). M and N are positive integers. In one example, M>1 and N=1, 2, . . . , or 80. In another example, M=1, 2, . . . or 14 and N>1. In a further example, 1<M<15 and 1<N<81.

In another example, the second RNTI may be generated (or computed) as:

The second RNTI=1+$s\_id$+14×$t\_id$+14×80×$f\_id$+14× 80×8×ul_carrier_id, where:

$s\_id$ is the index of the first OFDM symbol of the second part in the PRACH (0≤$s\_id$<14), $t\_id$ is the index of the first slot of the second part in the PRACH in a system frame (0≤$t\_id$<80), $f\_id$ is the index of second part of the PRACH in the frequency domain (0≤$f\_id$<X, X is an integer and X>=8), and ul_carrier_id is the UL carrier used for the MsgA transmission (0 for NUL carrier, and 1 for SUL carrier).

In a further example, the second RNTI may be generated (or computed) as:

The second RNTI=1+$s\_id$+14×$t\_id$+14×80×$f\_id$+14× 80×8×ul_carrier_id+offset, where:

$s\_id$ is the index of the first OFDM symbol of the PRACH (0≤$s\_id$<14), $t\_id$ is the index of the first slot of the PRACH in a system frame (0≤$t\_id$<80), $f\_id$ is the index of the first part of the PRACH in the frequency domain (0≤$f\_id$<8), ul_carrier_id is the UL carrier used for MsgA transmission (0 for NUL carrier, and 1 for SUL carrier), and offset can be a fixed value or a predetermined value (e.g., an integer) specified in a 3GPP specification. Alternatively, the offset can be configured by the base station 104 in a broadcast message or an RRC message.

The base station 104 then transmits 420C the DCI and the CRC scrambled with the second RNTI on a PDCCH to the UE 102. The base station also transmits 430C the MAC PDU to the UE 102 on physical resources, a transport block, or a PDSCH indicated in the DCI. The UE 102 then identifies whether the response message includes the first RNTI or the second RNTI by using both the first and second RNTIs. For example, the UE 102 may obtain or generate the second RNTI as the RNTI included in the payload in the MsgA. In another example, the UE 102 may obtain or generate the second RNTI based on the UE ID for the UE 102. In yet other examples, the UE 102 may obtain or generate the second RNTI using the equations described above. More specifically, the UE 102 may attempt to verify the CRC with the first RNTI and the DCI as described previously. If the UE 102 successfully verifies the CRC with the first RNTI and the DCI, the UE 102 may determine that the CRC is scrambled with the first RNTI. If the UE 102 does not successfully verify the CRC with the first RNTI and the DCI, the UE 102 may attempt to verify the CRC with the second RNTI and the DCI. If the UE 102 successfully verifies the CRC with the second RNTI and the DCI, the UE 102 may determine that the CRC is scrambled with the second RNTI.

In any event, the UE 102 identifies the DCI and obtains a PDSCH including the MAC PDU according to the DCI. Then the UE 102 decodes the MAC PDU using the format indicated by the RNTI. More specifically, because the CRC is scrambled with the second RNTI, the UE 102 decodes 444C the MAC PDU using the format of the MAC PDU including a MsgB (e.g., an RAR and a resolution). The UE 102 may identify the MsgB from the second MAC subheader.

Figure 5:
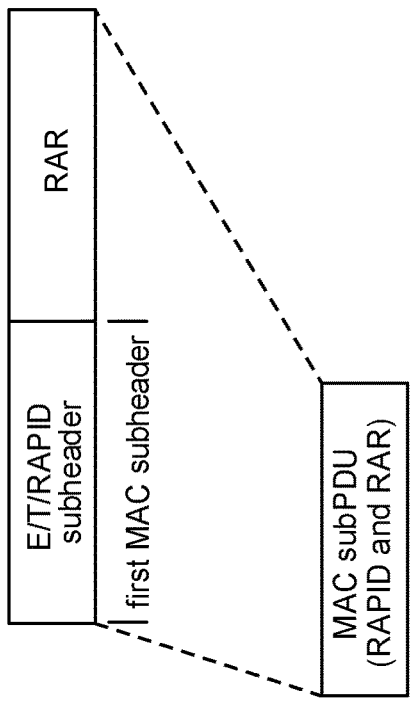
FIG. 5 illustrates an example format of a Medium Access Control (MAC) protocol data unit (PDU) in the response message including a random access response (RAR)
Figure 6:
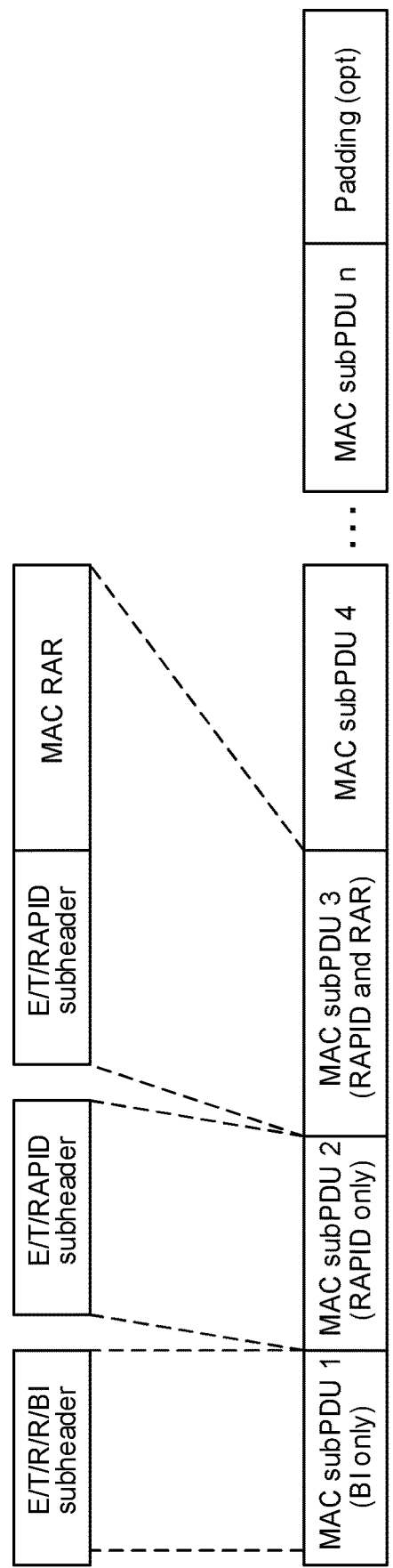
FIG. 6 illustrates another example format of a MAC PDU in the response message including the RAR.

FIG. 5 illustrates an example format of a MAC PDU in the response message including an RAR. The MAC PDU may also include padding (not shown). In other implementations, the MAC PDU includes MAC subPDUs as shown in FIG. 6. For example, the first MAC subheader may include E/T/RAPID fields and the first MAC subheader and the RAR may be combined into a MAC subPDU 3. In some scenarios, the base station 104 may not include a MAC subPDU 1 or a MAC subPDU 2 in the MAC PDU if they do not need to be transmitted. If the base station 104 determines to multiplex other MAC subPDU(s) for other UE(s), the base station 104 may include the other MAC subPDU(s) in the MAC PDU. In this case, "n" may be an integer such as 4, 5, 6, etc. The first MAC subheader and the RAR can be included in any one of the subPDUs 3, 4, 5, . . . n. The MAC subheader in FIG. 6 may include an E field which is a flag indicating if the MAC subPDU including this MAC subheader is the last MAC subPDU or not in the MAC PDU. The E field may be set to "1" to indicate at least another MAC subPDU follows. The E field may be set to "0" to indicate that the MAC subPDU including this MAC subheader is the last MAC subPDU in the MAC PDU. The MAC subheader also includes a T field which is a flag indicating whether the MAC subheader contains a RAPID or a Backoff Indicator (BI). The T field may be set to "0" to indicate the presence of a BI field in the subheader. The T field may be set to "1" to indicate the presence of a RAPID field in the subheader. Furthermore, the MAC subheader may include an R field which may be set to "0," and a BI field which identifies the overload condition in the cell. The size of the BI field may be four bits. Moreover, the MAC subheader may include a RAPID field which identifies the transmitted Random Access Preamble in the MsgA. The size of the RAPID field may be six bits. If the RAPID in the MAC subheader of a MAC subPDU corresponds to one of the Random Access Preambles configured for SI request, an RAR may not be included in the MAC subPDU.

In some implementations, the base station 104 includes the C-RNTI in the second MAC PDU if the base station 104 receives the C-RNTI in the payload of the MsgA. If the base station 104 includes the C-RNTI, the base station 104 may not include the contention resolution ID in the second MAC PDU. If the base station 104 does receive the C-RNTI in the MsgA, the base station 104 may include a temporary C-RNTI and the contention resolution ID in the second MAC PDU. In one aspect, the base station 104 may include the first 48 bits of the uplink CCCH message in the contention resolution ID. In some examples, the base station 104 may include a MAC SDU in the second MAC PDU. The second MAC PDU may contain an RRC response message (e.g., an RRC Setup, an RRC Resume, an RRC Reestablishment message or an RRC Early Data Complete message) responding to the RRC request message or contain an IP packet. If the base station 104 includes the MAC SDU, the base station 104 may not include the DL grant. Otherwise, the base station 104 may include the DL grant indicating a PDSCH containing the second MAC PDU.

In some scenarios, the base station 104 detects a Message 1 (Msg1) only consisting of a preamble from a UE 102 for a 4-step RACH procedure. In response to the detection, the base station 104 generates a third MAC PDU which includes a RAR and a MAC subheader for the RAR in a second MAC PDU format (e.g., as shown in FIG. 6). The MAC subheader includes a RAPID of the preamble and the RAR includes a TA command, a UL grant or a temporary C-RNTI. The base station 104 transmits the third MAC PDU to the UE 102 in response to the Msg1. In some implementations, the base station 104 calculates an RA-RNTI and generates a DCI and a CRC scrambled with the RA-RNTI to transmit the third MAC PDU to the UE 102. The base station 104 transmits the DCI and the CRC scrambled with the RA-RNTI on a PDCCH to the UE 102 and transmits the third MAC PDU in physical resources (e.g., a PDSCH) indicated in the DCI. The UE 102 receives the DCI and the CRC scrambled with the RA-RNTI on the PDCCH. The UE 102 uses the RA-RNTI to verify the CRC is scrambled with RA the-RNTI. The UE 102 then receives the third MAC PDU in the physical resources indicated in the DCI. The UE 102 adjusts its uplink timing according to the TA command and transmits a Message 3 (Msg3) in physical resources indicated by the UL grant to the base station 104. The base station 104 receives the Msg3 from the UE 102 in the physical resources indicated in the UL grant. Then the base station 104 transmits a DCI and a CRC scrambled with the temporary C-RNTI to the UE 102. The UE 102 receives a Message 4 (Msg4) in physical resources indicated in the DCI from the base station 104. In some examples, the Msg3 may include the uplink CCCH message, an IP packet, a PDCP PDU, or an SDAP PDU as described above. The Msg4 may include the contention resolution ID, the RRC response message, an IP packet, a PDCP PDU, or an SDAP PDU as described above. The UE 102 verifies whether the contention resolution ID is correct. For example, the UE 102 checks whether the contention resolution ID is equal to the first 48 bits of the uplink CCCH message in the Msg3. If the contention resolution ID is identical to the first 48 bits of the uplink CCCH message in the Msg3, the UE 102 determines the 4-step RACH procedure is completed successfully.

Figure 7:
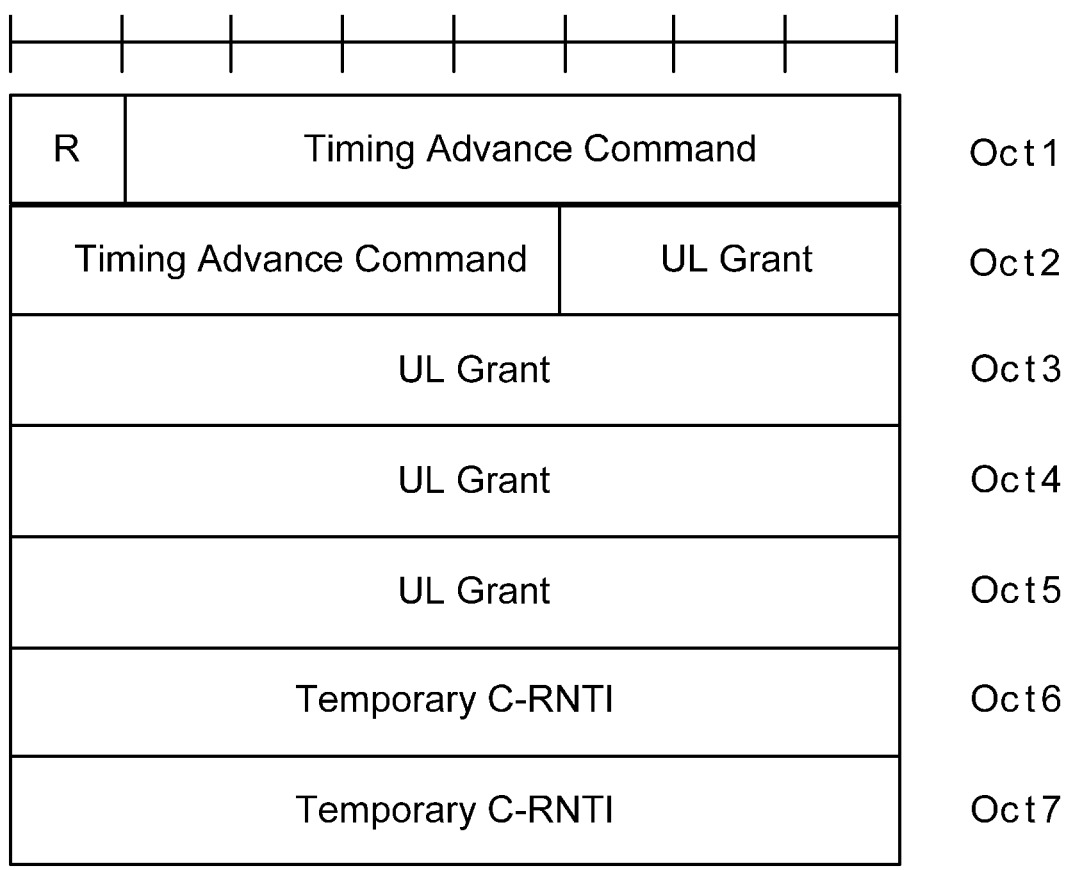
FIG. 7 illustrates an example format of an RAR included in the MAC PDU of FIG. 5 or FIG. 6.

FIG. 7 illustrates an example format of an RAR included in a MAC PDU. The RAR may include a reserved bit, one or more TA commands, one or more UL grants, or one or more temporary C-RNTIs.

Figure 8A:
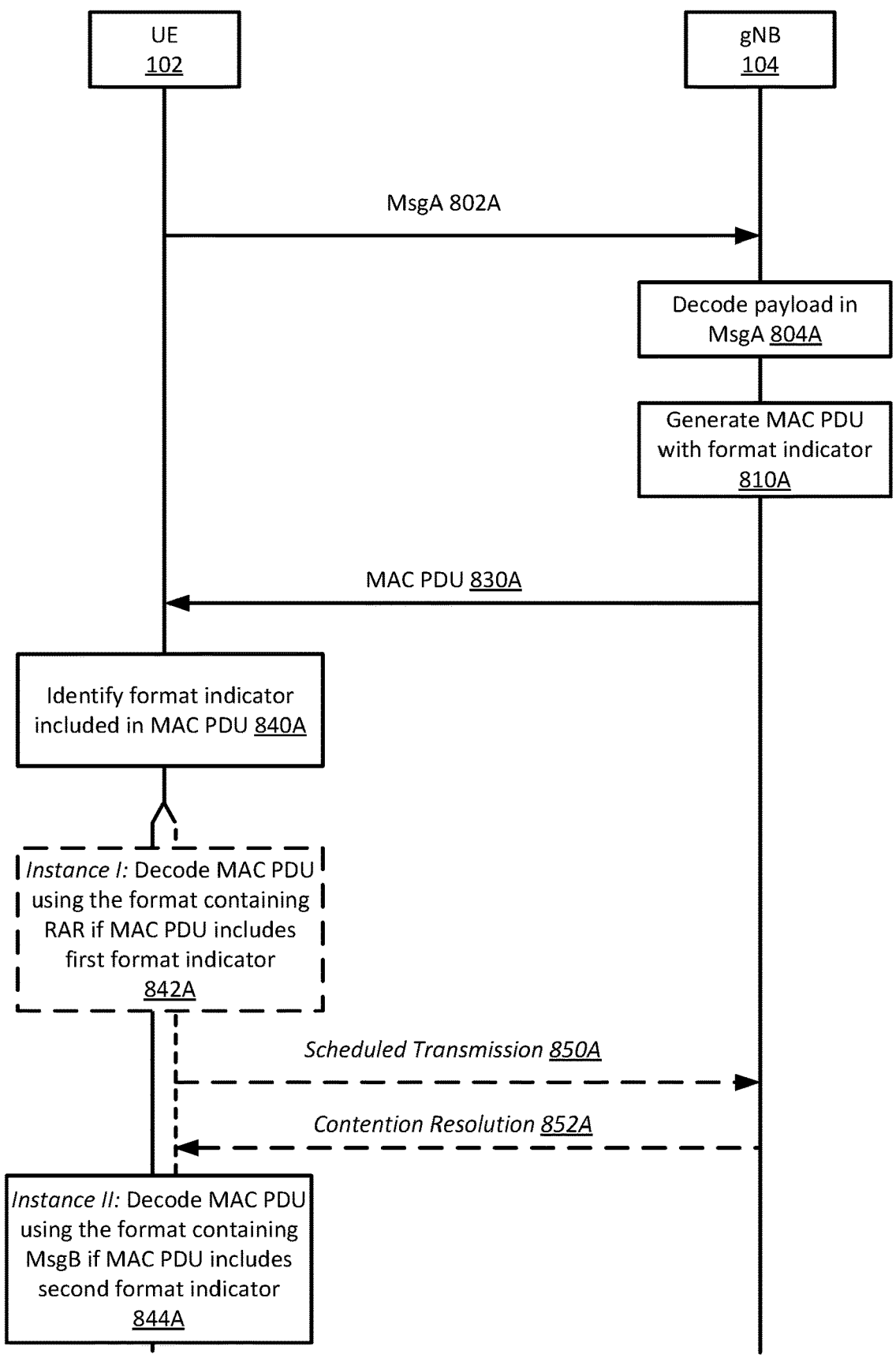
FIG. 8A is a messaging diagram of an example procedure for signaling to the user device a format in which to decode a response message from the base station using a PDU.

In addition to indicating the format for decoding a response message from the base station using an RNTI, the format may be indicated by a PDU included in the response message. FIG. 8A illustrates a messaging diagram of an example procedure for signaling to the user device a format in which to decode a response message from the base station using PDU. The UE 102 sends 802A a MsgA to the base station 104 including a random access preamble and a payload.

Then, the base station 104 attempts to decode 804A the payload. If the base station 104 detects a preamble in the MsgA but fails to decode the payload, the base station 104 generates 810A an RAR instead of a MsgB, and a first MAC PDU including the MAC subheader and the RAR. The RAR can a MAC control element or a MAC SDU. The first MAC PDU may indicate the format for decoding the first MAC PDU in the MAC subheader with a first indicator. For example, the first MAC PDU may include a first MAC subPDU having a first MAC subheader identifying the RAR. The first MAC subheader may include a reserved field, and an LCID value if the RAR is a fixed-size control element. The first MAC subheader may include a reserved field, a format field, an LCID field, and a length field, if the RAR is a variable-sized control element. The first MAC subheader indicates to the UE 102 that the first MAC subPDU is in the first format including an RAR. In one implementation, the base station 104 may generate a MAC subheader including E, T, and/or RAPID fields, and include the MAC subheader in the RAR. In another implementation, there is no need to include the MAC subheader for the RAR in the MAC subPDU. Instead, the base station 104 may generate a MAC control element containing the RAPID field and generate a MAC subheader for the MAC control element. That is, the base station 104 may generate a second MAC subPDU including the MAC subheader and the MAC control element, and include the second MAC subPDU in the first MAC PDU together with the first MAC subPDU.

On the other hand, if the base station 104 detects a preamble in the MsgA and successfully decodes the payload, the base station 104 generates 810A a second MAC PDU including a second MAC subheader and a MsgB. For example, the base station 104 generates a MAC subPDU including the second MAC subheader and the MsgB. The MsgB can be a MAC service data unit (SDU). The second MAC PDU may indicate the format for decoding the MsgB in the second MAC subheader with a second indicator. For example, the second MAC subheader may include a reserved field, a format field, an LCID field, and a length field. In some implementations, the MsgB includes one or more fields in the RAR, one or more MAC CEs, one or more new fields (not included in the RAR), or at least one MAC SDU. The MAC SDU may include an RLC PDU or an RRC response message (e.g., an RRC Setup message, an RRC Resume message, an RRC Reestablishment message, or an RRC Early Data Complete message)).

To transmit the MAC PDU, the base station 104 generates an RNTI, DCI, and a CRC of the DCI scrambled with the RNTI. Then the base station 104 transmits the DCI and the CRC scrambled with the RNTI on a PDCCH to the UE 102. The base station also transmits 830A the MAC PDU to the UE 102 on physical resources, a transport block, or a PDSCH indicated in the DCI.

The UE 102 then identifies 840A whether the MAC PDU in the response message includes the first MAC subheader or the second MAC subheader to identify the format for decoding the MAC PDU. Then the UE 102 decodes the MAC PDU using the format indicated by the first MAC subheader or the second MAC subheader. More specifically, in a first instance, if the MAC PDU includes the first MAC subheader, the UE 102 identifies the MAC PDU (or a MAC subPDU in the MAC PDU) includes an RAR and decodes 842A the RAR according to an RAR format. Then the UE 102 proceeds to provide 850A additional information to the base station 104, such as a payload/scheduled transmission as in the four-step RACH procedure. In response, the base station 104 transmits 852A a contention resolution to the UE 102.

In a second instance, if the MAC PDU includes the second MAC subheader, the UE 102 identifies the MAC PDU (or a MAC subPDU in the MAC PDU) includes a MsgB and decodes 844A the MsgB (e.g., RAR with a resolution) according to a MsgB format.

Figure 8B:
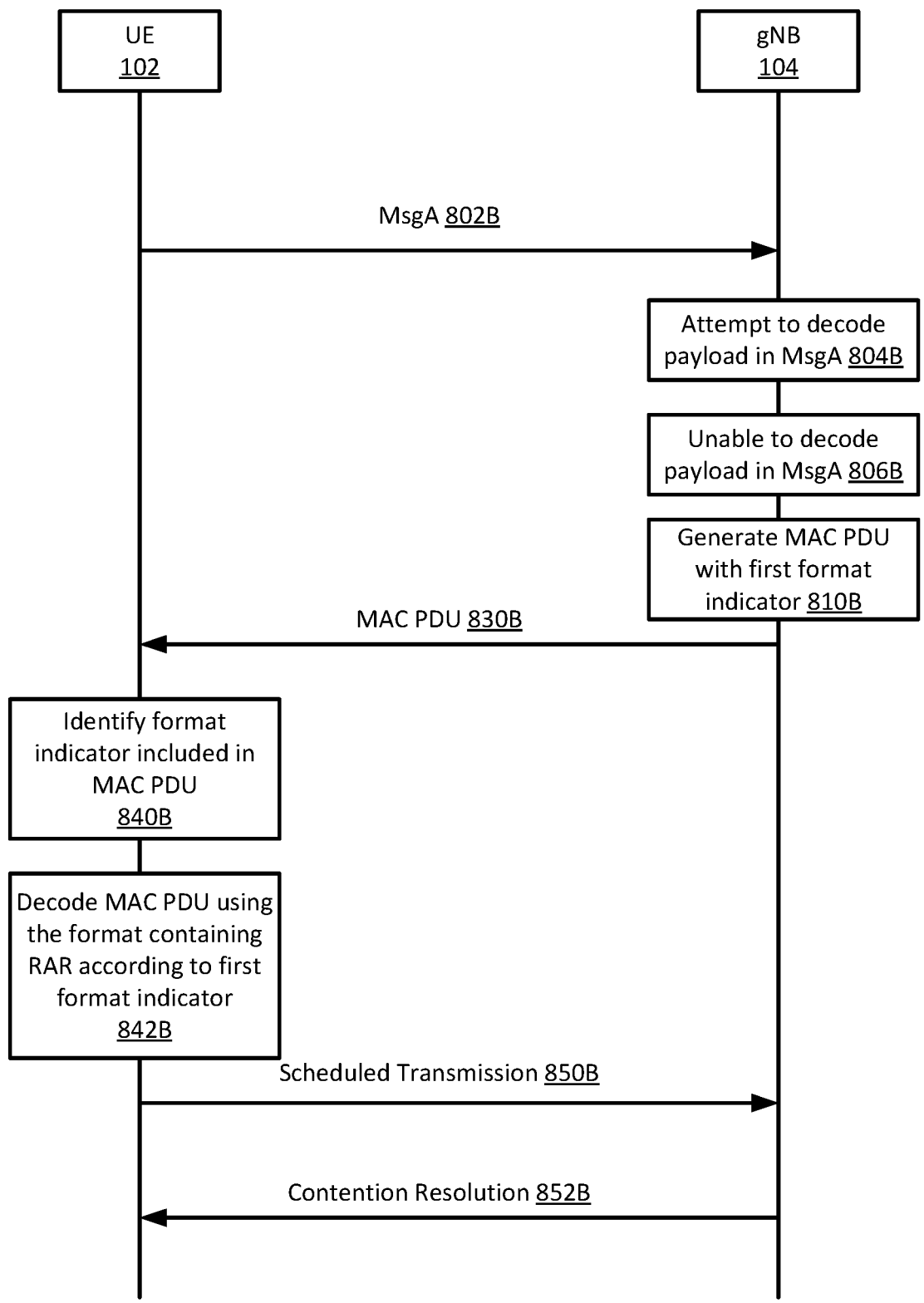
FIG. 8B is a messaging diagram of an example procedure for signaling to the user device a first format in which to decode a response message from the base station using a PDU having a first format indicator.

FIG. 8B illustrates a detailed messaging diagram of the example procedure illustrated in FIG. 8A when the base station 104 is unable to decode the payload from the UE 102. The UE 102 sends 802B a MsgA to the base station 104 including a random access preamble and a payload. Then, the base station 104 attempts to decode 804B the payload. The base station 104 detects a preamble in the MsgA but fails to decode 806B the payload. As a result, the base station 104 generates 810B an RAR instead of a MsgB, a first MAC subheader for the RAR, and a MAC PDU including the first MAC subheader and the RAR. The first MAC subheader may be a format indicator that a MAC subPDU in the MAC PDU includes an RAR. In some implementations, the RAR includes at least some of: a reserved bit, one or more TA commands, one or more UL grants, or one or more temporary C-RNTIs.

To transmit the MAC PDU, the base station 104 generates an RNTI, DCI, and a CRC of the DCI scrambled with the RNTI. The base station 104 then transmits the DCI and the CRC scrambled with the RNTI on a PDCCH to the UE 102. The base station 104 also transmits 830B the MAC PDU to the UE 102 on physical resources, a transport block, or a PDSCH indicated in the DCI. The UE 102 then identifies 840B whether the MAC PDU in the response message includes the first MAC subheader or the second MAC subheader.

Then the UE 102 decodes the MAC PDU using the format indicated by the identified MAC subheader. More specifically, because the MAC PDU includes the first MAC subheader, the UE 102 identifies a MAC subPDU in the MAC PDU including an RAR and decodes 842B the RAR according to a format of the RAR or a format of the MAC subPDU. Then the UE 102 proceeds to provide 850B additional information to the base station 104, such as a payload/scheduled transmission as in the four-step RACH procedure. In response, the base station 104 transmits 852B a contention resolution to the UE 102.

Figure 8C:
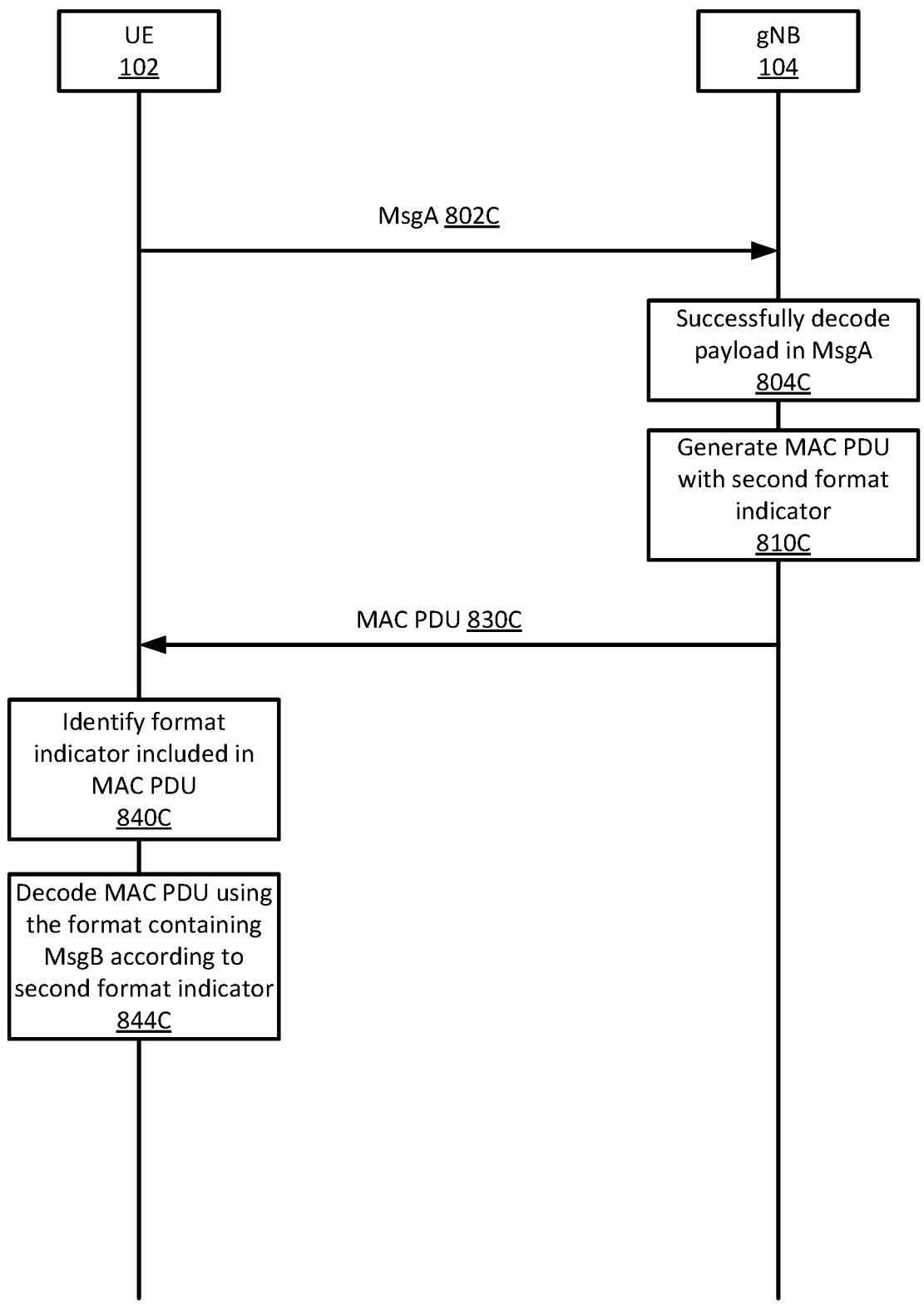
FIG. 8C is a messaging diagram of an example procedure for signaling to the user device a second format in which to decode a response message from the base station using a PDU having a second format indicator.

FIG. 8C illustrates a detailed messaging diagram of the example procedure illustrated in FIG. 8A when the base station 104 successfully decodes the payload from the UE 102. The UE 102 sends 802C a MsgA to the base station 104 including a random access preamble and a payload. Then, the base station 104 detects a preamble in the MsgA and successfully decodes 804C the payload. As a result, the base station 104 generates a MAC PDU including a MsgB. In some implementations, the MsgB includes one or more fields in the RAR, one or more MAC CEs, one or more new fields (not included in the RAR), or at least one MAC SDU. In some implementations, the base station 104 may generate 810C the MAC PDU which includes a second MAC subheader having a reserved field, a format field, an LCID field, and/or a length field, and the MsgB. The second MAC subheader may be a format indicator that the MAC PDU is in a second format including a MsgB.

To transmit the MAC PDU, the base station 104 generates an RNTI, DCI, and a CRC of the DCI scrambled with the RNTI. The base station 104 then transmits the DCI and the CRC scrambled with the RNTI on a PDCCH to the UE 102. The base station 104 also transmits 830C the MAC PDU to the UE 102 on physical resources, a transport block, or a PDSCH indicated in the DCI. The UE 102 then identifies 840C whether the MAC PDU in the response message includes the first MAC subheader or the second MAC subheader.

Then the UE 102 decodes the MAC PDU using the format indicated by the identified MAC subheader. More specifically, because the MAC PDU includes the second MAC subheader, the UE 102 identifies a MAC subPDU in the MAC PDU contains a MsgB and decodes 844C the MsgB according to a format of the MsgB or a format of the MAC subPDU.

FIG. 9 illustrates an example format of a MAC subPDU within a MAC PDU in the response message including a first MAC subheader and an RAR. The MAC subPDU includes a first MAC subheader identifying the RAR. The first MAC subheader includes an R field (e.g., two bits) and an LCID value (e.g., six bits) if the RAR is a fixed-sized CE. The first MAC subheader includes an R field (e.g., one bit), an F field (e.g., one bit), an LCID field (e.g., six bits), and an L field (e.g., eight or 16 bits), if the RAR is a variable-sized CE. There is a specific LCID value for the RAR which may be defined in the 3GPP specification. The L field indicates the length of the RAR in bytes if the LCID field contains the specific LCID value for the RAR. The F field indicates the size of the L field. The size of the F field may be one bit. The value "0" may indicate the L field is eight bits long. The value "1" may indicate the L field is 16 bits long.

In some implementations, the MAC subheader is a first MAC subheader when the MAC subheader includes information elements (1)-(4). The information elements (1)-(4) may include (1) a RAPID, (2) a TA command, (3) a UL grant, and (4) a temporary C-RNTI. The MAC subheader is a second MAC subheader when the MAC subheader includes information elements (1)-(5), where information element (5) is a MAC SDU. More specifically, information elements (1)-(5) may include (1) a C-RNTI, (2) a TA command, (3) a contention resolution ID, (4) a DL grant, and (5) a MAC SDU. Accordingly, if the MAC subheader does not include a MAC SDU or includes information elements (1)-(4) having one or more of (1) a RAPID, (2) a TA command, (3) a UL grant, and (4) a temporary C-RNTI, the UE 102 may determine that the MAC subheader is the first MAC subheader, and decodes the MAC PDU in the first format having an RAR. If the MAC subheader includes the MAC SDU or includes information elements (1)-(5) having one or more of (1) a C-RNTI, (2) a TA command, (3) a contention resolution ID, (4) a DL grant, and (5) a MAC SDU, the UE 102 determines that the MAC subheader is the second MAC subheader, and decodes the MAC PDU in the second format have a MsgB.

FIG. 10 illustrates another example format of an RAR included in the MAC PDU of FIG. 9. The RAR may include one or more reserved bits, one or more RAPIDs, one or more TA commands, one or more UL grants, or one or more temporary C-RNTIs.

Figure 11:
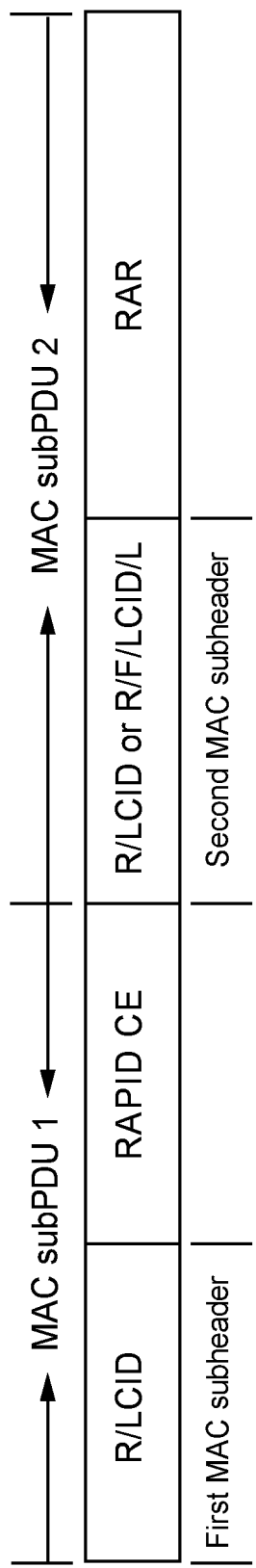
FIG. 11 illustrates an example format of MAC subPDUs included within a MAC PDU in the response message having an RAR.
Figure 12:
FIG. 12 illustrates an example format of a random access preamble identifier (RAPID) control element (CE) included within a first MAC subPDU of FIG. 11.

FIG. 11 illustrates an example format of MAC subPDUs included within a MAC PDU in the response message having an RAR. The MAC PDU includes information elements (1)-(4) which may be CEs. For example, the MAC PDU may include two MAC subPDUs. The first MAC subPDU may include a first MAC subheader for a RAPID CE and the RAPID CE. The RAPID CE may include a RAPID (e.g., six bits, and zero or one R fields (e.g., two bits) as shown in FIG. 12. The first MAC subheader may include an R field (e.g., two bits) and an LCID value (e.g., six bits). The second MAC subPDU may include a second MAC subheader for the RAR including the TA command, the UL grant and the temporary C-RNTI (e.g., as shown in FIG. 7). The second MAC subheader may include an R field (e.g., two bits) and an LCID value (e.g., six bits) if the RAR is a fixed-sized CE. The second MAC subheader may include an R field (e.g., one bit), an F field (e.g., one bit), an LCID field (e.g., six bits), and an L field (e.g., eight or 16 bits), if the RAR is a variable-sized CE. The LCID value of the first MAC subheader may be different from the LCID value of the second MAC subheader.

As shown in FIG. 11, the first and second MAC subheaders may include R/LCID fields or R/F/LCID/L fields. The LCID field may include a specific LCID value for the RAPID CE and a specific LCID value for the RAR. The specific LCID values may be defined in the 3GPP specification. The L field may indicate the length of the RAR in bytes if the LCID field contains the specific LCID value for the RAR. The F field may indicate the size of the L field. The size of the F field is one bit. The value "0" indicates the L field is 8 bits. The value "1" indicates the L field is 16 bits. The R field may be set to "0." In other implementations, each of the information elements (1)-(4) is a CE and has a corresponding MAC subheader. The corresponding MAC subheaders may include R/LCID fields if the CE is a fixed size CE. The corresponding MAC subheaders may include R/F/LCID/L fields if the CE is a variable-sized CE. Each of the information elements (1)-(4) may have its own LCID value, e.g., as required by the corresponding 3GPP specification.

Figure 13:
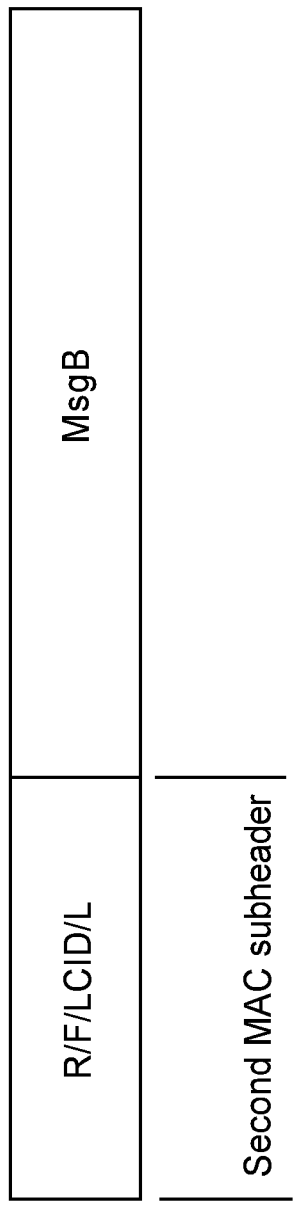
FIG. 13 illustrates an example format of a MAC PDU in the response message including a second MAC subheader and a MsgB.

FIG. 13 illustrates an example format of a MAC PDU in the response message including a second MAC subheader and a MsgB. The second MAC subheader may include an R field (e.g., one bit), an F field (e.g., one bit), an LCID field (e.g., six bits), and an L field (e.g., eight or 16 bits).

Figure 14:
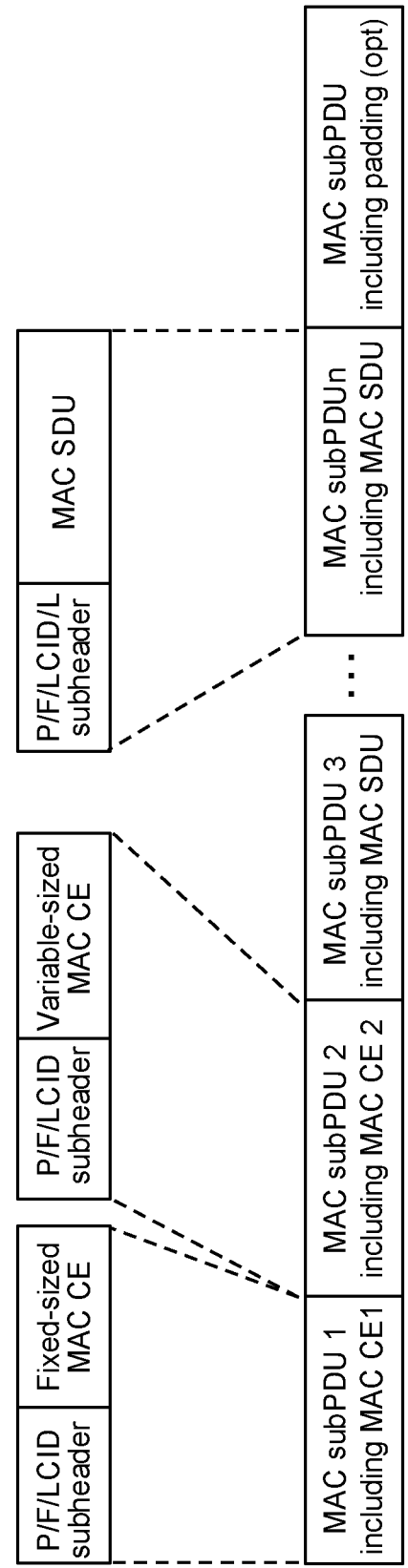
FIG. 14 illustrates an example format of MAC PDU in the response message including a second MAC subheader and a MsgB.

FIG. 14 illustrates another example format of a MAC PDU in the response message including a second MAC subheader and a MsgB. In some implementations, each of the information elements (1)-(4) is a CE and has a corresponding MAC subheader. At least one of the second MAC subheaders includes the corresponding MAC subheader if the base station 104 includes the CE. A MAC SDU may also have a corresponding MAC subheader. At least one second MAC subheader includes the corresponding MAC subheader if the base station 104 includes the MAC SDU. The size of padding can be zero, such that there is no padding. Also in some implementations, some of the information elements (1)-(5) may be included in a CE and the CE may have a MAC subheader. For example, a CE may contain information elements (1) and (2) and may have a corresponding MAC subheader. At least one second MAC subheader may include the corresponding MAC subheader if the base station 104 includes the CE. Each of information elements (3) and (4) is a CE and has a corresponding MAC subheader for the CE. At least one second MAC subheader includes the corresponding MAC subheader if the base station 104 includes the CE. The MAC SDU may also have a corresponding MAC subheader. At least one second MAC subheader includes the corresponding MAC subheader if the base station 104 includes the MAC SDU.

Figure 15:
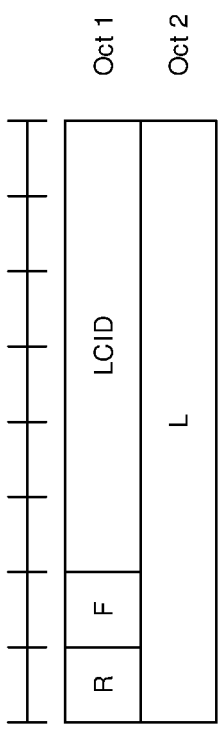
FIG. 15 illustrates an example format of a MAC subheader included within a MAC service data unit (SDU) in the response message.
Figure 16:
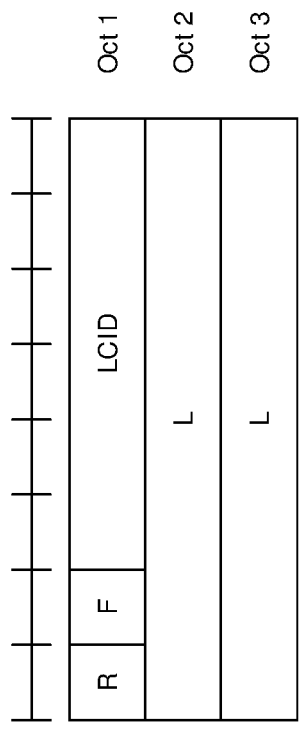
FIG. 16 illustrates another example format of a MAC subheader included within a MAC SDU in the response message.
Figure 17:
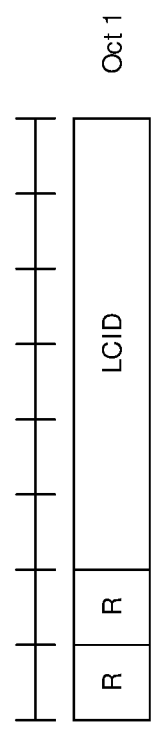
FIG. 17 illustrates yet another example format of a MAC subheader included within a MAC SDU in the response message.

If a CE has a variable size depending on its content, the CE is a variable-sized MAC CE and a MAC subheader for the variable-sized MAC CE has the four header fields R/F/LCID/L. If a CE has a fixed size, the CE is a fixed sized MAC CE and a MAC subheader for the fixed sized MAC CE has the two header fields R/LCID. In one example, each of the information elements (1)-(4) may have fixed sizes. A CE containing one or more of the information elements (1)-(4) may be a fixed sized MAC CE and a MAC subheader as in FIG. 17 may be used for the CE. Information element (5) (i.e., the MAC SDU) may have a variable size and a MAC subheader as in FIG. 15 or FIG. 16 may be used for the MAC SDU.

The LCID field in the second MAC subheader identifies a logical channel instance of a corresponding MAC SDU or a type of TA corresponding to a CE or padding. The LCID field size may be six bits. The information elements (1)-(5) have different LCID values which may be specified in a 3GPP specification. The L field in the second MAC subheader indicates a length of the MsgB and a corresponding MAC SDU or variable-sized CE in bytes. The size of the L field may be indicated by the F field. The F field in the second MAC subheader indicates the size of the length field. The size of the F field is one bit. The value "0" indicates that the L field is eight bits. The value "1" indicates that the L field is 16 bits.

Figure 18:
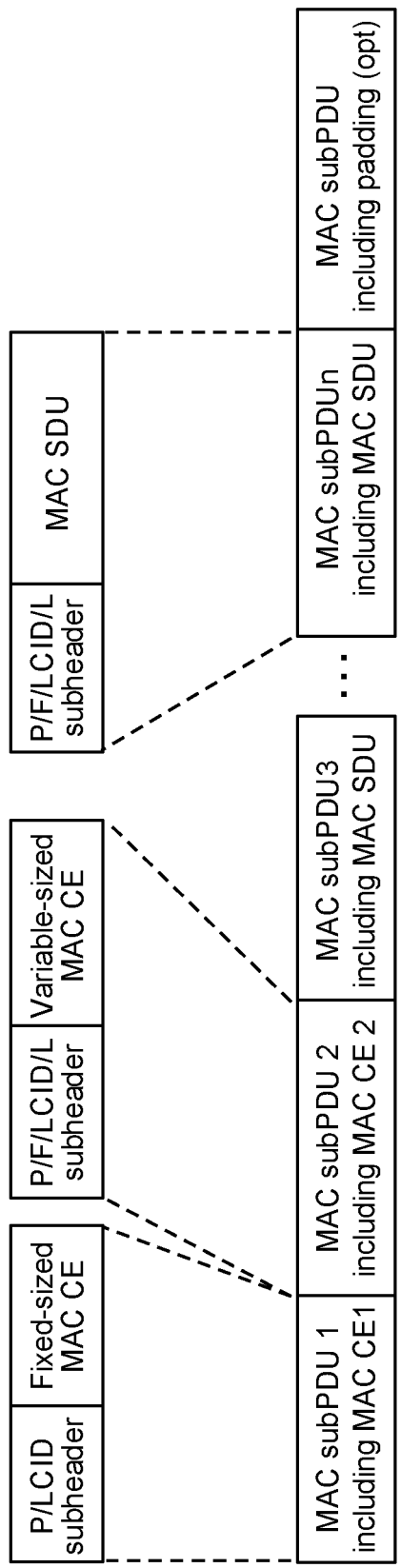
FIG. 18 illustrates an example format of a MAC PDU in the response message.

FIG. 18 illustrates another example format of a MAC PDU in the response message. In one example, the MAC subPDU as shown in FIG. 9 may be the MAC subPDU as shown in FIG. 18. In another example, the MAC subPDUs as shown in FIG. 11 may be the MAC subPDUs as shown in FIG. 18. If each of the information elements (1)-(4) is a CE and has a corresponding MAC subheader, the corresponding MAC subheader and the CE form a MAC subPDU included in FIG. 18.

In some implementations, the UE 102 monitors PDCCH in one or more PDCCH occasions with the RNTI. When the UE 102 receives the DCI and the CRC scrambled with the RNTI, the UE receives the physical resources (or the transport block on the PDSCH) according to the DCI to get a MAC PDU. The UE 102 uses the MAC PDU format (e.g., as shown in FIG. 18) to process the MAC PDU. In one example, the UE 102 finds the first MAC subheader as illustrated in FIG. 9. The UE 102 determines or identifies the RAR is included in the MAC PDU and extracts the RAR from the MAC PDU according to the MAC PDU format shown in FIG. 9. The UE 102 then retrieves the information elements (1)-(4) according to the RAR format shown in the FIG. 10.

In one example, if the UE 102 identifies the second MAC subheader as illustrated in FIG. 13, the UE 102 identifies or determines that MsgB is included in the MAC PDU and extracts the MsgB from the MAC PDU according to a fixed size for each of the information elements (1)-(4). If the length field in the second MAC subheader is larger than a total of the fixed sizes for the information elements (1)-(4), then the UE 102 extracts the information element (5) (i.e., the MAC SDU) from the MAC PDU.

In another example, if the UE 102 identifies a MAC subheader within at least one of the second MAC subheaders as illustrated in FIG. 14, the UE 102 identifies or determines a corresponding CE or MAC SDU included in the MAC PDU and extracts the corresponding CE or MAC SDU from the MAC PDU. For example, the UE 102 may identify an LCID value in a MAC subheader indicative of a CE which contains one or more of a C-RNTI, a TA command, a contention resolution ID, and/or a DL grant. The UE 102 then uses the format of the CE to extract the C-RNTI, TA command, contention resolution ID, and/or DL grant. The DL grant may also be referred to as a DL assignment.

Figure 19A:
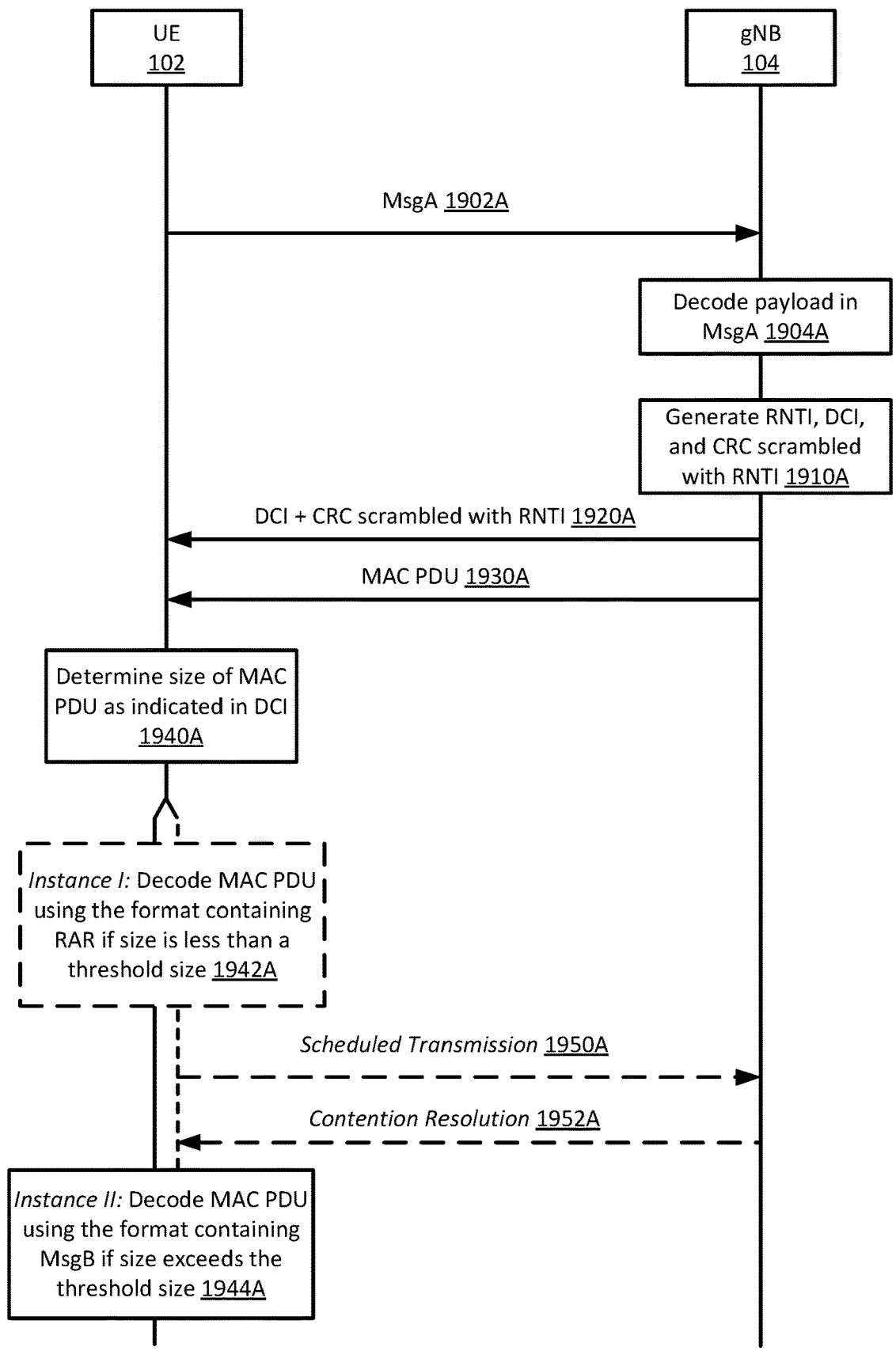
FIG. 19A is a messaging diagram of an example procedure for signaling to the user device a format in which to decode a response message from the base station using the size of the PDU.

In addition to indicating the format for decoding a response message from the base station using an RNTI or MAC PDU, the format may be indicated based on a size of at least a portion of the response message, such as the size of the MAC PDU. FIG. 19A illustrates a messaging diagram of an example procedure for signaling to the user device a format in which to decode a response message from the base station using the size of the PDU. The UE 102 sends 1902A a MsgA to the base station 104 including a random access preamble and a payload.

Then, the base station 104 attempts to decode 1904A the payload. If the base station 104 detects a preamble in the MsgA but fails to decode the payload, the base station 104 generates an RAR instead of a MsgB, and a MAC PDU including the MAC subheader and the RAR. On the other hand, if the base station 104 detects a preamble in the MsgA and successfully decodes the payload, the base station 104 generates a MAC PDU including a MAC subheader and a MsgB.

To transmit the MAC PDU, the base station 104 generates 1910A an RNTI, DCI, and a CRC of the DCI scrambled with the RNTI. The base station 104 also transmits an indication of the size of a portion of the response message (e.g., the MAC PDU) to the UE 102. For example, in some implementations, the DCI may include an indication of the size of the MAC PDU. Then the base station 104 transmits 1920A the DCI and the CRC scrambled with the RNTI on a PDCCH to the UE 102. The base station also transmits 1930A the MAC PDU to the UE 102 on physical resources, a transport block, or a PDSCH indicated in the DCI.

The UE 102 then determines 1940A the size of the MAC PDU. For example, the UE 102 may obtain the size of the MAC PDU from the DCI. In another example, the UE 102 may obtain the size of the MAC PDU from the MAC subheader, such as from the length field of the MAC subheader. The UE 102 then compares the size of the MAC PDU to a size threshold.

Then, in a first instance, the UE 102 decodes 1942A the MAC PDU according to the first format having an RAR without a resolution if the size is less than a threshold size. The UE 102 proceeds to provide 1950A additional information to the base station 104, such as a payload/scheduled transmission as in the four-step RACH procedure. In response, the base station 104 transmits 1952A a contention resolution to the UE 102. In a second instance, if the size is greater than or equal to the threshold size, the UE 102 decodes 1944A the MAC PDU using the format of the MAC PDU including MsgB (e.g., RAR with a resolution).

Figure 19B:
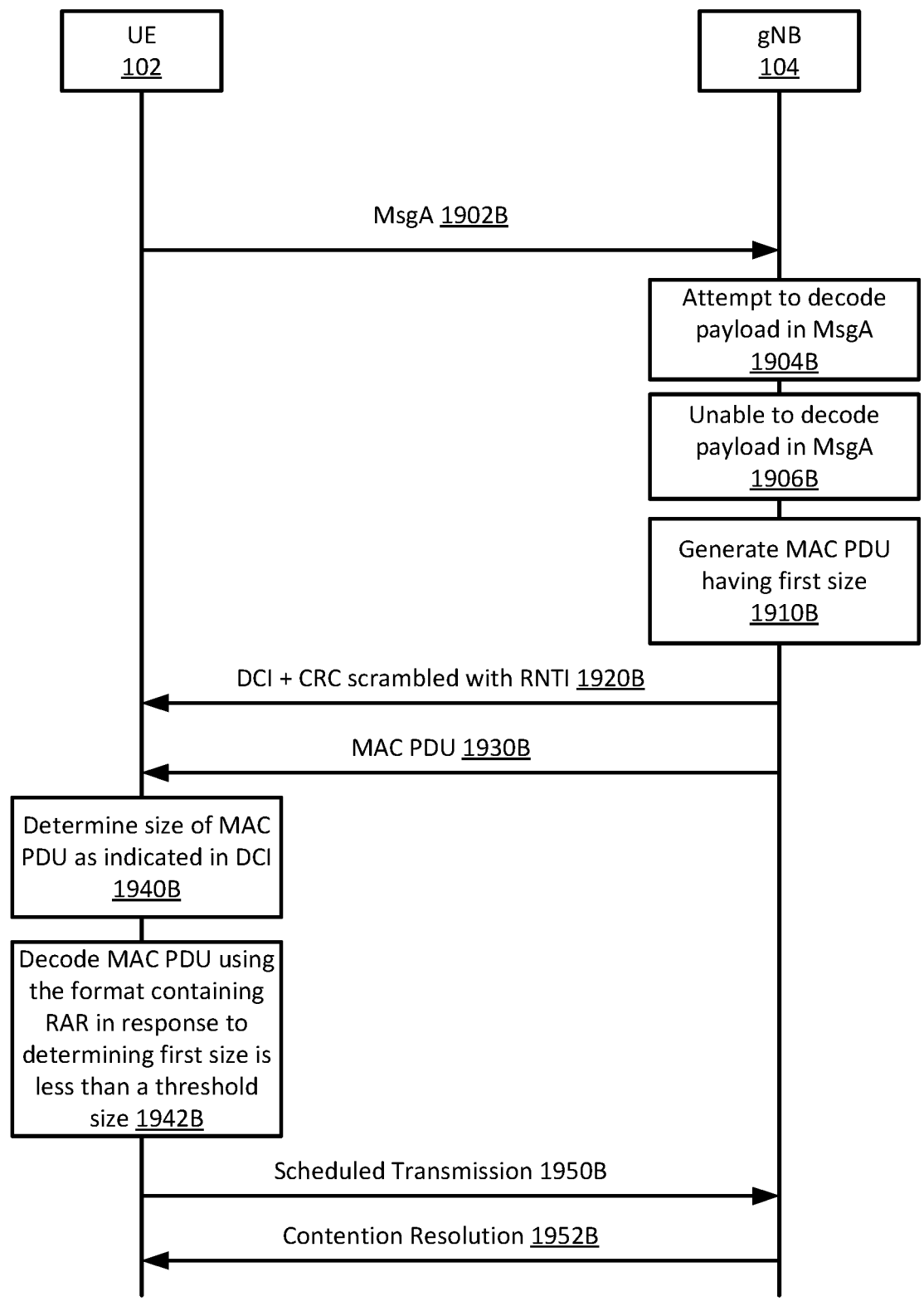
FIG. 19B is a messaging diagram of an example procedure for signaling to the user device a first format in which to decode a response message from the base station when the size of the PDU is less than a threshold size.

FIG. 19B illustrates a detailed messaging diagram of the example procedure illustrated in FIG. 19A when the base station 104 is unable to decode the payload from the UE 102. The UE 102 sends 1902B a MsgA to the base station 104 including a random access preamble and a payload. Then, the base station 104 attempts to decode 1904B the payload. The base station 104 detects a preamble in the MsgA but fails to decode 1906B the payload. As a result, the base station 104 generates 1910B an RAR instead of a MsgB, a MAC subheader for the RAR, and a MAC PDU having a first size less than a size threshold, where the MAC PDU includes the first MAC subheader and the RAR.

To transmit the MAC PDU, the base station 104 generates an RNTI, DCI, and a CRC of the DCI scrambled with the RNTI. The base station 104 then transmits 1920B the DCI and the CRC scrambled with the RNTI on a PDCCH to the UE 102. The base station 104 also transmits 1930B the MAC PDU to the UE 102 on physical resources, a transport block, or a PDSCH indicated in the DCI. Moreover, the base station 104 transmits an indication of the size of the MAC PDU, such as an indication of a first size less than a threshold size. For example, in some implementations, the DCI may include an indication of the size of the MAC PDU.

The UE 102 then determines 1940B the size of the MAC PDU. For example, the UE 102 may obtain the size of the MAC PDU from the DCI. In another example, the UE 102 may obtain the size of the MAC PDU from the MAC subheader, such as from the length field of the MAC subheader. The UE 102 then compares the size of the MAC PDU to a size threshold. Then the UE 102 decodes the MAC PDU using the format indicated based on the size of the MAC PDU. More specifically, because the size of the MAC PDU is a first size which is less than the size threshold, the UE 102 decodes 1942B the MAC PDU using the format of the MAC PDU including an RAR without a resolution. Then the UE 102 proceeds to provide 1950B additional information to the base station 104, such as a payload/scheduled transmission as in the four-step RACH procedure. In response, the base station 104 transmits 1952B a contention resolution to the UE 102.

Figure 19C:
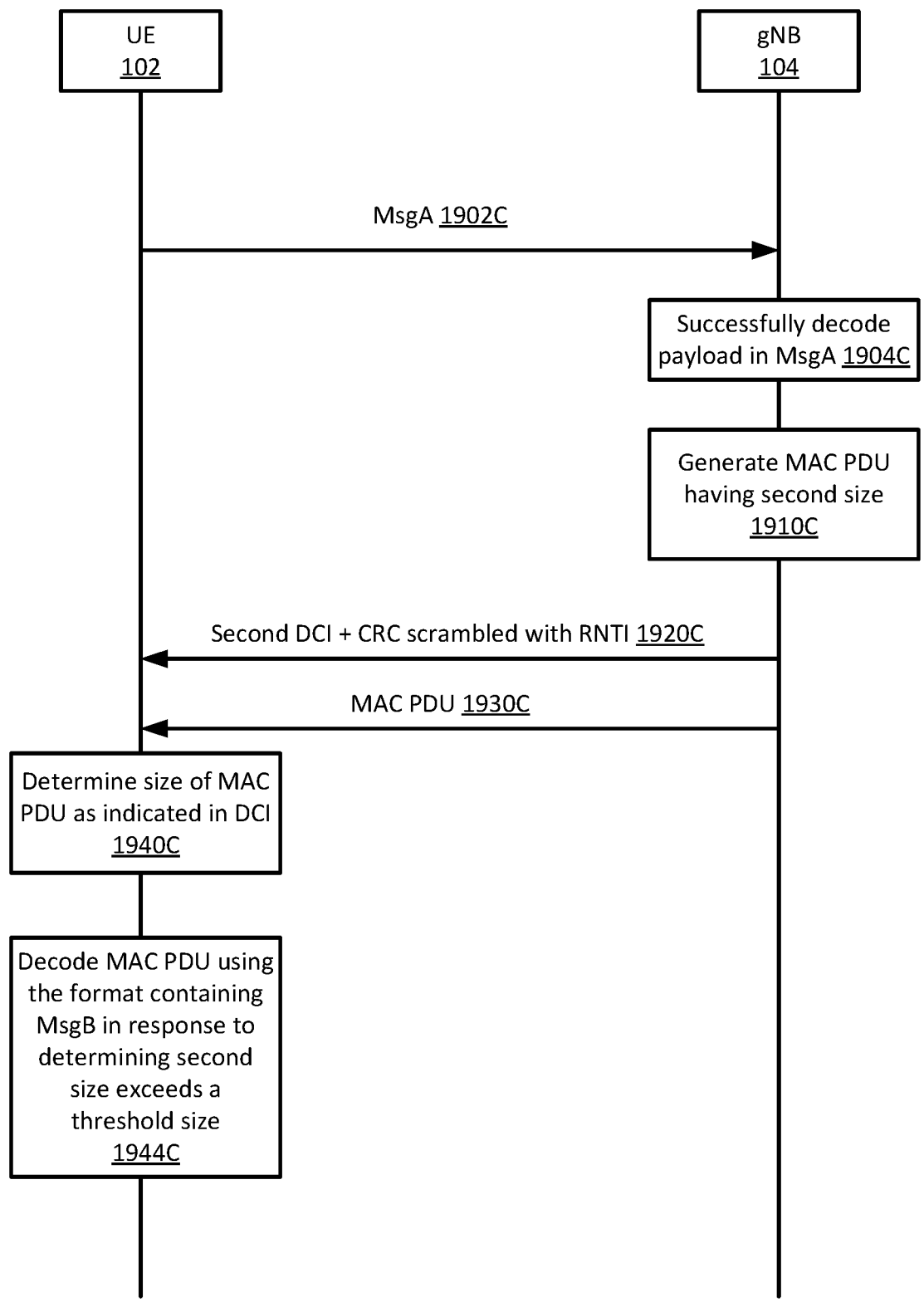
FIG. 19C is a messaging diagram of an example procedure for signaling to the user device a second format in which to decode a response message from the base station when the size of the PDU is greater than or equal to the threshold size.

FIG. 19C illustrates a detailed messaging diagram of the example procedure illustrated in FIG. 19A when the base station 104 successfully decodes the payload from the UE 102. The UE 102 sends 1902C a MsgA to the base station 104 including a random access preamble and a payload. Then, the base station 104 detects a preamble in the MsgA and successfully decodes 1904C the payload. As a result, the base station 104 generates a MAC PDU including a MsgB. In some implementations, the base station 104 may generate 1910C the MAC PDU having a second size greater than or equal to the size threshold, where the MAC PDU includes a MAC subheader and the MsgB.

To transmit the MAC PDU, the base station 104 generates an RNTI, DCI, and a CRC of the DCI scrambled with the RNTI. The base station 104 then transmits 1920C the DCI and the CRC scrambled with the RNTI on a PDCCH to the UE 102. The base station 104 also transmits 1930C the MAC PDU to the UE 102 on physical resources, a transport block, or a PDSCH indicated in the DCI. Moreover, the base station 104 transmits an indication of the size of the MAC PDU, such as an indication of a second size greater than or equal to the threshold size. For example, in some implementations, the DCI may include an indication of the size of the MAC PDU.

The UE 102 then determines 1940C the size of the MAC PDU. For example, the UE 102 may obtain the size of the MAC PDU from the DCI. In another example, the UE 102 may obtain the size of the MAC PDU from the MAC subheader, such as from the length field of the MAC subheader. The UE 102 then compares the size of the MAC PDU to a size threshold. Then the UE 102 decodes the MAC PDU using the format indicated based on the size of the MAC PDU. More specifically, because the size of the MAC PDU is a second size which is greater than or equal to the size threshold, the UE 102 decodes 1944C the MAC PDU using the format of the MAC PDU including a MsgB having an RAR and a resolution.

Figure 20A:
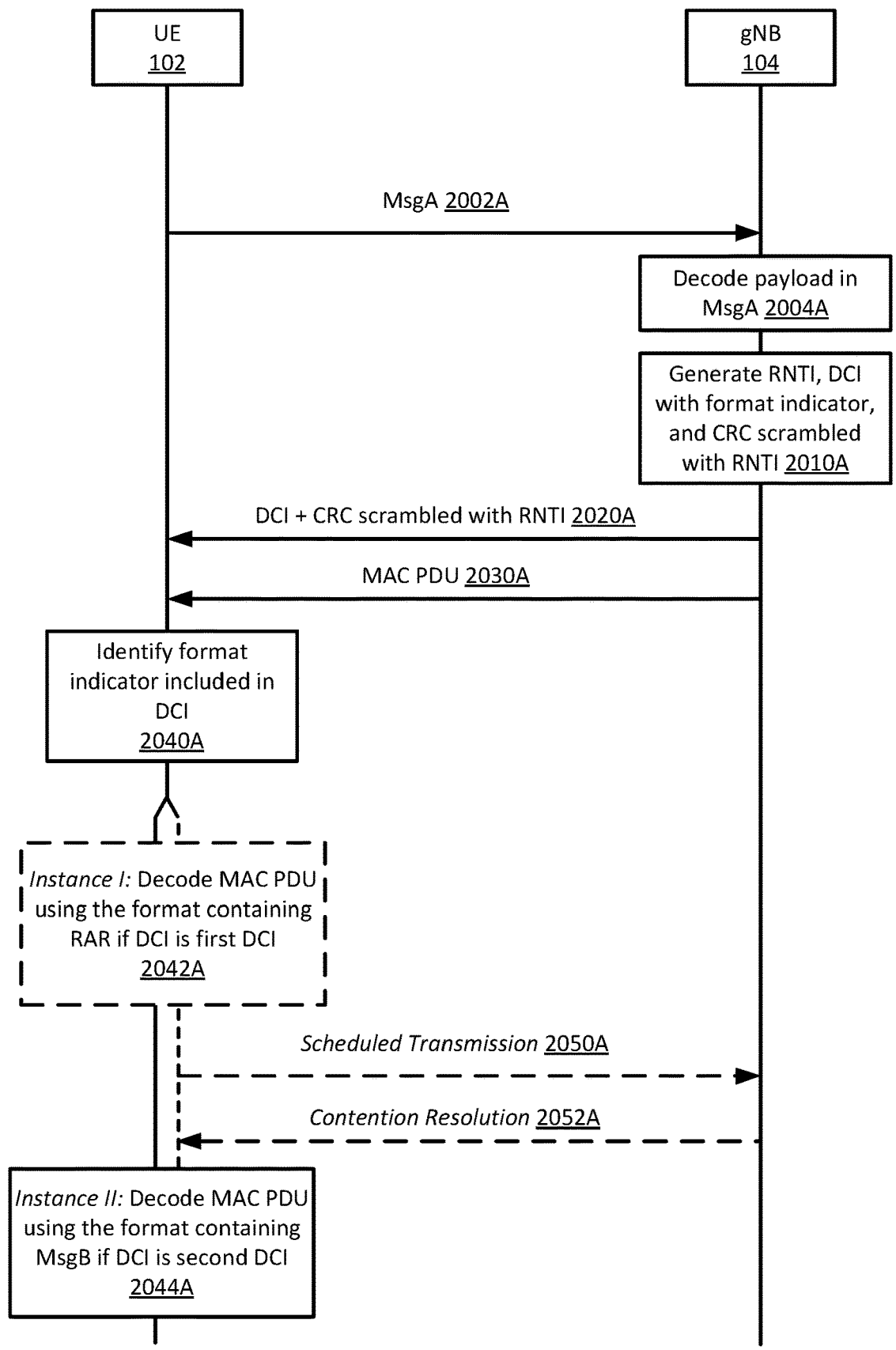
FIG. 20A is a messaging diagram of an example procedure for signaling to the user device a format in which to decode a response message from the base station using a downlink control information (DCI) element having a format indicator.

In yet other implementations, the format may be indicated by a DCI element included in the response message. FIG. 20A illustrates a messaging diagram of an example procedure for signaling to the user device a format in which to decode a response message from the base station using a DCI element. The UE 102 sends 2002A a MsgA to the base station 104 including a random access preamble and a payload.

Then, the base station 104 attempts to decode 2004A the payload. If the base station 104 detects a preamble in the MsgA but fails to decode the payload, the base station 104 generates an RAR instead of a MsgB, and a MAC PDU including the MAC subheader and the RAR. To transmit the MAC PDU, the base station 104 generates 2010A an RNTI, a first DCI, and a CRC of the first DCI scrambled with the RNTI. Then the base station 104 transmits 2020A the first DCI and the CRC scrambled with the RNTI on a PDCCH to the UE 102. The first DCI may be a first indicator of the format of the response message. The base station 104 also transmits 2030A the MAC PDU to the UE 102 on physical resources, a transport block, or a PDSCH indicated in the first DCI.

On the other hand, if the base station 104 detects a preamble in the MsgA and successfully decodes the payload, the base station 104 generates a MAC PDU including a MAC subheader and a MsgB. To transmit the MAC PDU, the base station 104 generates 2010A an RNTI, a second DCI different from the first DCI, and a CRC of the first DCI scrambled with the RNTI. Then the base station 104 transmits 2020A the second DCI and the CRC scrambled with the RNTI on a PDCCH to the UE 102. The second DCI may be a second indicator of the format of the response message. The base station also transmits 2020A the MAC PDU to the UE 102 on physical resources, a transport block, or a PDSCH indicated in the second DCI.

In some implementations, the first DCI may indicate first physical radio resources specific for transmitting the first MAC PDU (or the RAR). The second DCI may indicate second physical radio resources specific for transmitting the second PDU (or the MsgB). In other implementations, the first DCI has a field to indicate the MAC PDU includes the RAR. The second DCI has a field indicating the second MAC PDU includes the MsgB. Also in some implementations, the first DCI and the second DCI may have different DCI formats. For example, the first DCI may follow a first DCI format and the second DCI may follow a second DCI format. The format of the DCI may indicate the format in which to decode the MAC PDU. If the first DCI format indicates the MAC PDU is in a first format having the RAR and the second DCI format indicates the MAC PDU is in a second format having the MsgB, the first DCI and the second DCI may not need respective fields indicating the RAR and the MsgB. In other implementations, the first DCI and the second DCI have the same DCI format, and the DCI includes a field indicating the format for decoding the MAC PDU.

In any event, the UE 102 then identifies 2040A whether the DCI in the response message is the first DCI or the second DCI to identify the format for decoding the MAC PDU. Then the UE 102 decodes the MAC PDU using the format indicated by the first DCI or the second DCI. More specifically, in a first instance, if the DCI is the first DCI, the UE 102 decodes 2042A the MAC PDU using the format of the MAC PDU including an RAR without a resolution. Then the UE 102 proceeds to provide 2050A additional information to the base station 104, such as a payload/scheduled transmission as in the four-step RACH procedure. In response, the base station 104 transmits 2052A a contention resolution to the UE 102. In a second instance, if the DCI is the second DCI, the UE 102 decodes 2044A the MAC PDU using the format of the MAC PDU including a MsgB (e.g., RAR with a resolution).

Figure 20B:
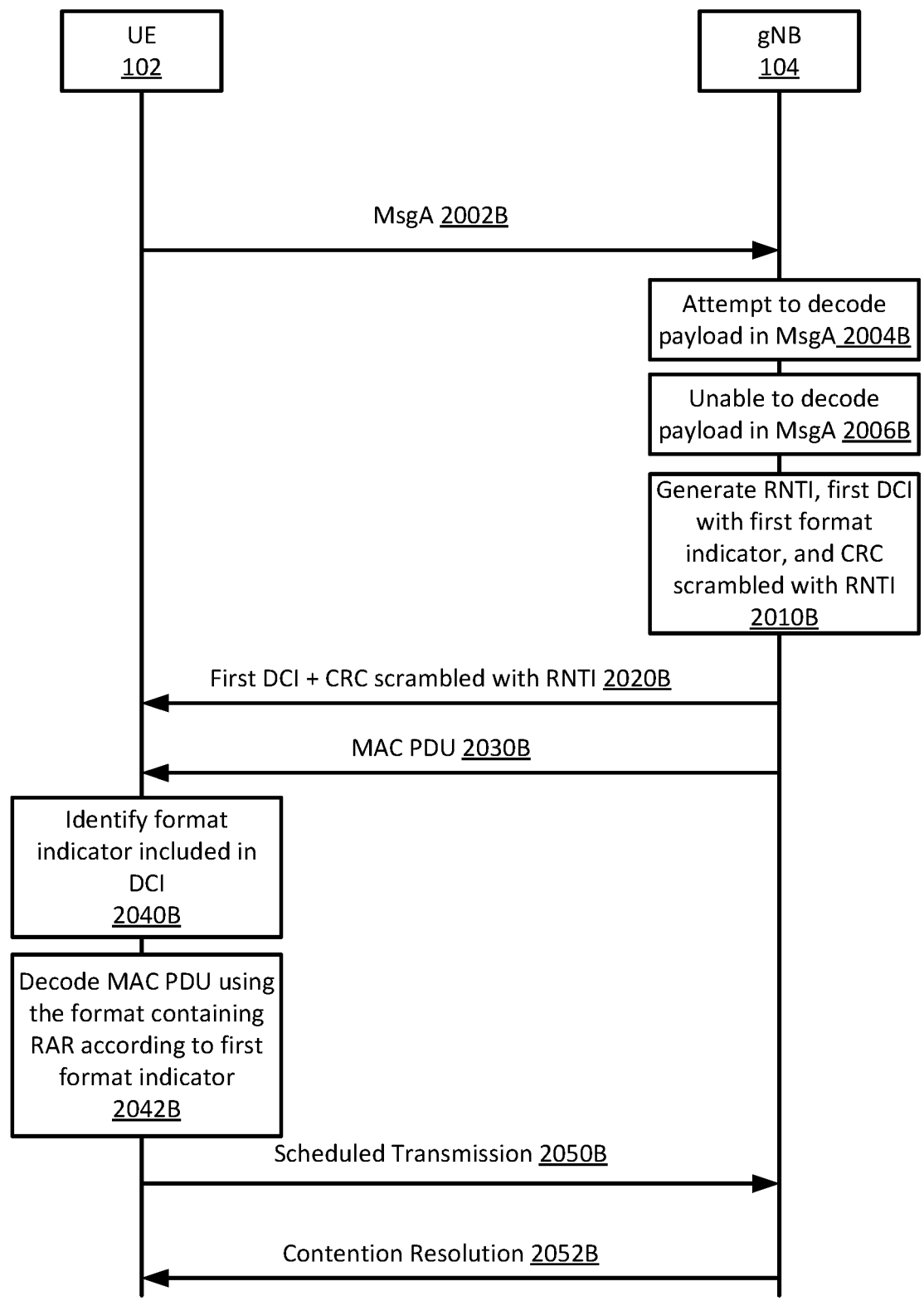
FIG. 20B is a messaging diagram of an example procedure for signaling to the user device a first format in which to decode a response message from the base station using a DCI element having a first format indicator.

FIG. 20B illustrates a detailed messaging diagram of the example procedure illustrated in FIG. 20A when the base station 104 is unable to decode the payload from the UE 102. The UE 102 sends 2002B a MsgA to the base station 104 including a random access preamble and a payload. Then, the base station 104 attempts to decode 2004B the payload. The base station 104 detects a preamble in the MsgA but fails to decode 2006B the payload. As a result, the base station 104 generates an RAR instead of a MsgB, a MAC subheader for the RAR, and a MAC PDU including the MAC subheader and the RAR.

To transmit the MAC PDU, the base station 104 generates 2010B an RNTI, a first DCI, and a CRC of the DCI scrambled with the RNTI. The base station 104 then transmits 2020B the first DCI and the CRC scrambled with the RNTI on a PDCCH to the UE 102. The base station 104 also transmits 2030B the MAC PDU to the UE 102 on physical resources, a transport block, or a PDSCH indicated in the DCI. The UE 102 then identifies 2040B whether the DCI in the response message includes the first DCI or the second DCI. The first and second DCIs may include different fields, have different field values, or may be in different formats.

Then the UE 102 decodes the MAC PDU using the format indicated by the DCI. More specifically, because the DCI is a first DCI, the UE 102 decodes 2042B the MAC PDU using the format of the MAC PDU including an RAR without a resolution. Then the UE 102 proceeds to provide 2050B additional information to the base station 104, such as a payload/scheduled transmission as in the four-step RACH procedure. In response, the base station 104 transmits 2052B a contention resolution to the UE 102.

Figure 20C:
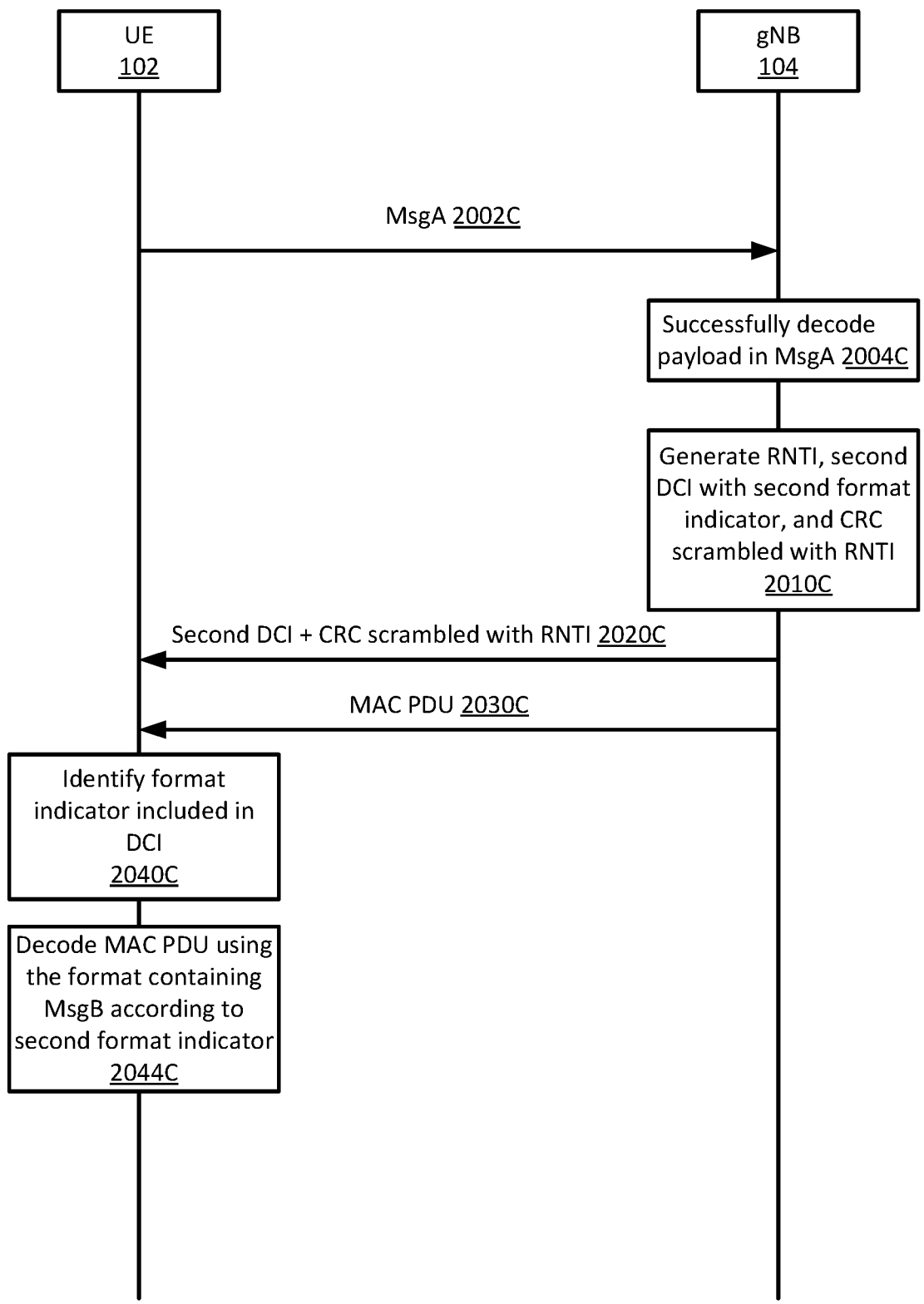
FIG. 20C is a messaging diagram of an example procedure for signaling to the user device a second format in which to decode a response message from the base station using a DCI element having a second format indicator.

FIG. 20C illustrates a detailed messaging diagram of the example procedure illustrated in FIG. 20A when the base station 104 successfully decodes the payload from the UE 102. The UE 102 sends 2002C a MsgA to the base station 104 including a random access preamble and a payload. Then, the base station 104 detects a preamble in the MsgA and successfully decodes 2004C the payload. As a result, the base station 104 generates a MAC PDU including a MsgB. In some implementations, the base station 104 may generate the MAC PDU which includes a MAC subheader and the MsgB.

To transmit the MAC PDU, the base station 104 generates 2010C an RNTI, a second DCI, and a CRC of the second DCI scrambled with the RNTI. The base station 104 then transmits 2020C the second DCI and the CRC scrambled with the RNTI on a PDCCH to the UE 102. The base station 104 also transmits 2040C the MAC PDU to the UE 102 on physical resources, a transport block, or a PDSCH indicated in the DCI. The UE 102 then identifies 2044C whether the DCI in the response message includes the first DCI or the second DCI. The first and second DCIs may include different fields, have different field values, or may be in different formats.

Then the UE 102 decodes the MAC PDU using the format indicated by the identified DCI. More specifically, because the DCI is a second DCI, the UE 102 decodes 2064 the MAC PDU using the format of the MAC PDU including a MsgB having an RAR and a resolution.

Figure 21:
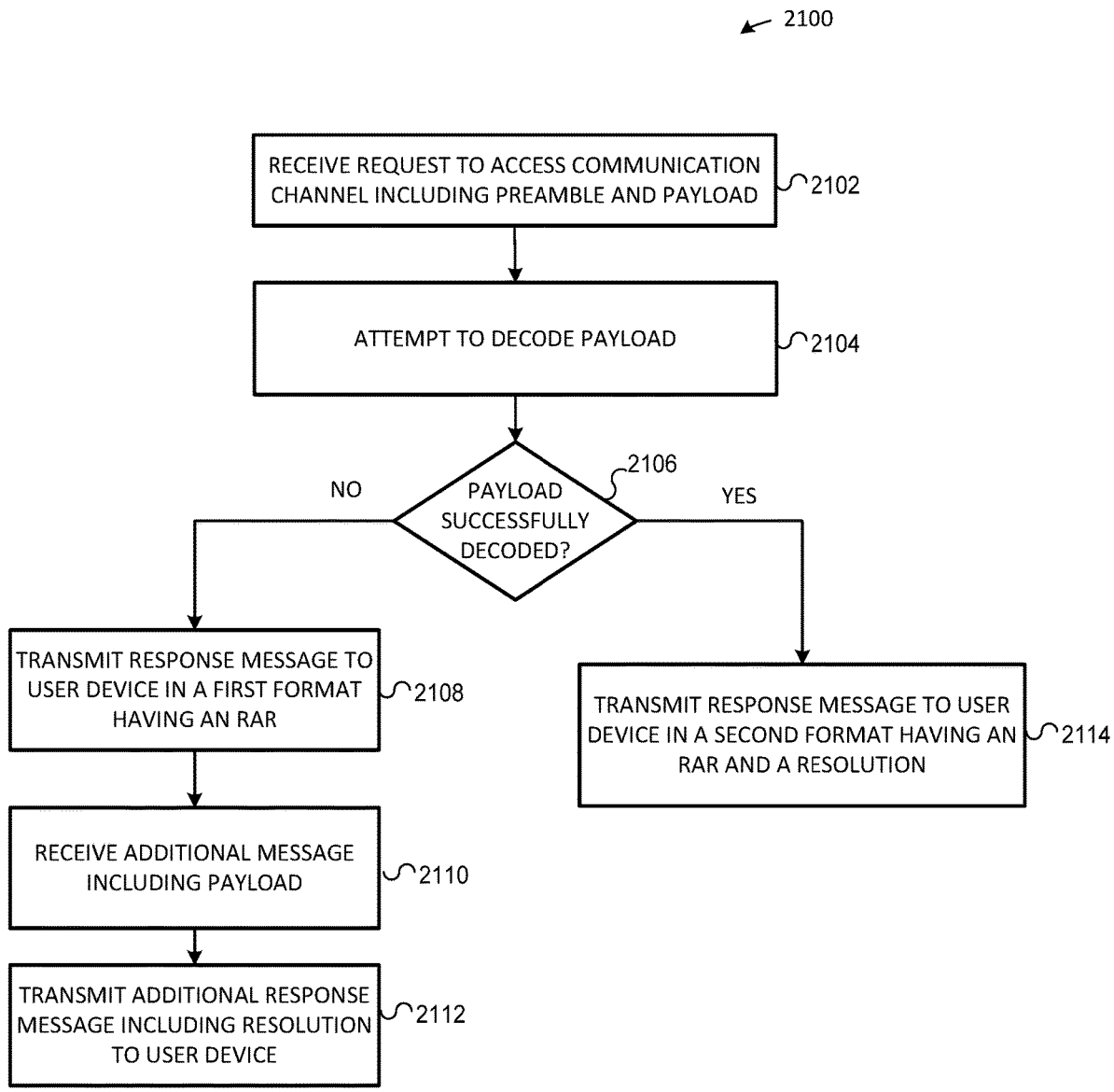
FIG. 21 is a flow diagram of an example method for granting access to a communication channel, which can be implemented in the base station of FIG. 1.

Referring to FIG. 21, a method 2100 can be implemented in the processing hardware of a base station using hardware, firmware, software, or any suitable combination of hardware, firmware, and software. For convenience, FIG. 21 is discussed below with example reference to the base station 104, in which one or more of the modules 132-138 can implement the method 2100.

The method 2100 begins at block 2102, where the base station 104 receives a request to access a communication channel from a UE 102. The request may be a MsgA having a random access preamble and a payload. As a more specific example, the MsgA can be associated with the transmission 402A of FIG. 4A, transmission 402B of FIG. 4B, transmission 402C of FIG. 4C, transmission 802A of FIG. 8A, transmission 802B of FIG. 8B, transmission 802C of FIG. 8C, transmission 1902A of FIG. 19A, transmission 1902B of FIG. 19B, transmission 1902C of FIG. 19C, transmission 2002A of FIG. 20A, transmission 2002B of FIG. 20B, or transmission 2002C of FIG. 20C.

At block 2104, the base station 104 attempts to decode the payload. In the examples above, the base station 104 attempts to decode the payload at step 404A of FIG. 4A, step 404B of FIG. 4B, step 404C of FIG. 4C, step 804A of FIG. 8A, step 804B of FIG. 8B, step 804C of FIG. 8C, step 1904A of FIG. 19A, step 1904B of FIG. 19B, step 1904C of FIG. 19C, step 2004A of FIG. 20A, step 2004B of FIG. 20B, or step 2004C of FIG. 20C.

The base station 104 then selects a format of a response message to send to the UE 102 in accordance with whether the payload was decoded successfully. More specifically, if the base station 104 detects a preamble in the MsgA but fails to decode the payload, the base station 104 generates the response message having a first format including an RAR instead of a MsgB, a MAC subheader for the RAR, and a MAC PDU including the MAC subheader and the RAR. The base station 104 also generates an RNTI, DCI, and a CRC of the DCI scrambled with the RNTI. The base station 104 then transmits to the UE 102 a response message in a first format having an RAR (block 2108). As a more specific example, the response message in the first format having an RAR can be associated with the transmissions 420B, 430B of FIG. 4B, transmission 830B of FIG. 8B, transmissions 1920B, 1930B of FIG. 19B, or transmissions 2020B, 2030B of FIG. 20B.

The response message may include the DCI, and a CRC of the DCI scrambled with the RNTI in a PDCCH and the MAC PDU in a PDSCH. The response message may also include an indication of the format of the response message which the UE 102 utilizes to decode the response message in accordance with the indicated format. For example, the format of the response message may be indicated in the RNTI which is scrambled with the DCI. If the RNTI is a first RNTI, the UE 102 may determine that the response message, and more particularly, the MAC PDU is in the first format having an RAR. If the RNTI is a second RNTI, the UE 102 may determine that the response message, and more particularly, the MAC PDU is in a second format having a MsgB.

In another example, the format of the response message may be indicated in the MAC PDU, such as in the MAC subheader. If the MAC PDU includes a first MAC subheader, the UE 102 may determine that the response message, and more particularly, the MAC PDU is in the first format having an RAR. If the MAC PDU includes a second MAC subheader, the UE 102 may determine that the response message, and more particularly, the MAC PDU is in a second format having a MsgB.

In yet another example, the format of the response message may be indicated by the size of a portion of the response message, such as a size of the MAC PDU. In some implementations, the DCI includes an indication of the size of the MAC PDU. If the size of the MAC PDU is less than a threshold size, the UE 102 may determine that the response message, and more particularly, the MAC PDU is in the first format having an RAR. If the size of the MAC PDU is greater than or equal to the threshold size, the UE 102 may determine that the response message, and more particularly, the MAC PDU is in a second format having a MsgB.

In another example, the format of the response message may be indicated in the DCI. If the DCI is a first DCI, the UE 102 may determine that the response message, and more particularly, the MAC PDU is in the first format having an RAR. If the DCI is a second DCI, the UE 102 may determine that the response message, and more particularly, the MAC PDU is in a second format having a MsgB.

In any event, at block 2110, the base station receives an additional message from the UE 102 including a payload/scheduled transmission. As a more specific example, the additional message from the UE 102 can be associated with the transmission 450A of FIG. 4A, transmission 450B of FIG. 4B, transmission 850A of FIG. 8A, transmission 850B of FIG. 8B, transmission 1950A of FIG. 19A, transmission 1950B of FIG. 19B, transmission 2050A of FIG. 20A, or transmission 2050B of FIG. 20B.

The base station then transmits an additional response message including a resolution to the UE 102 (block 2112). As a more specific example, the additional response message from the base station 104 can be associated with the transmission 452A of FIG. 4A, transmission 452B of FIG. 4B, transmission 852A of FIG. 8A, transmission 852B of FIG. 8B, transmission 1952A of FIG. 19A, transmission 1952B of FIG. 19B, transmission 2052A of FIG. 20A, or transmission 2052B of FIG. 20B.

On the other hand, if the base station 104 detects the preamble in the MsgA and successfully decodes the payload, the base station 104 generates the response message in a second format different from the first format, where a MAC PDU includes a MsgB. The base station 104 also generates an RNTI, DCI, and a CRC of the DCI scrambled with the RNTI. The base station 104 then transmits the response message in the second format having a MsgB to the UE 102 (block 2114). As a more specific example, the response message in the second format having a MsgB can be associated with the transmissions 420C, 430C of FIG. 4C, transmission 830C of FIG. 8C, transmissions 1920C, 1930C of FIG. 19C, or transmissions 2020C, 2030C of FIG. 20C.

The response message may include the DCI and a CRC of the DCI scrambled with the RNTI in a PDCCH and the MAC PDU in a PDSCH. The response message may also include an indication of the format of the response message which the UE 102 utilizes to decode the response message in accordance with the indicated format.

Figure 22:
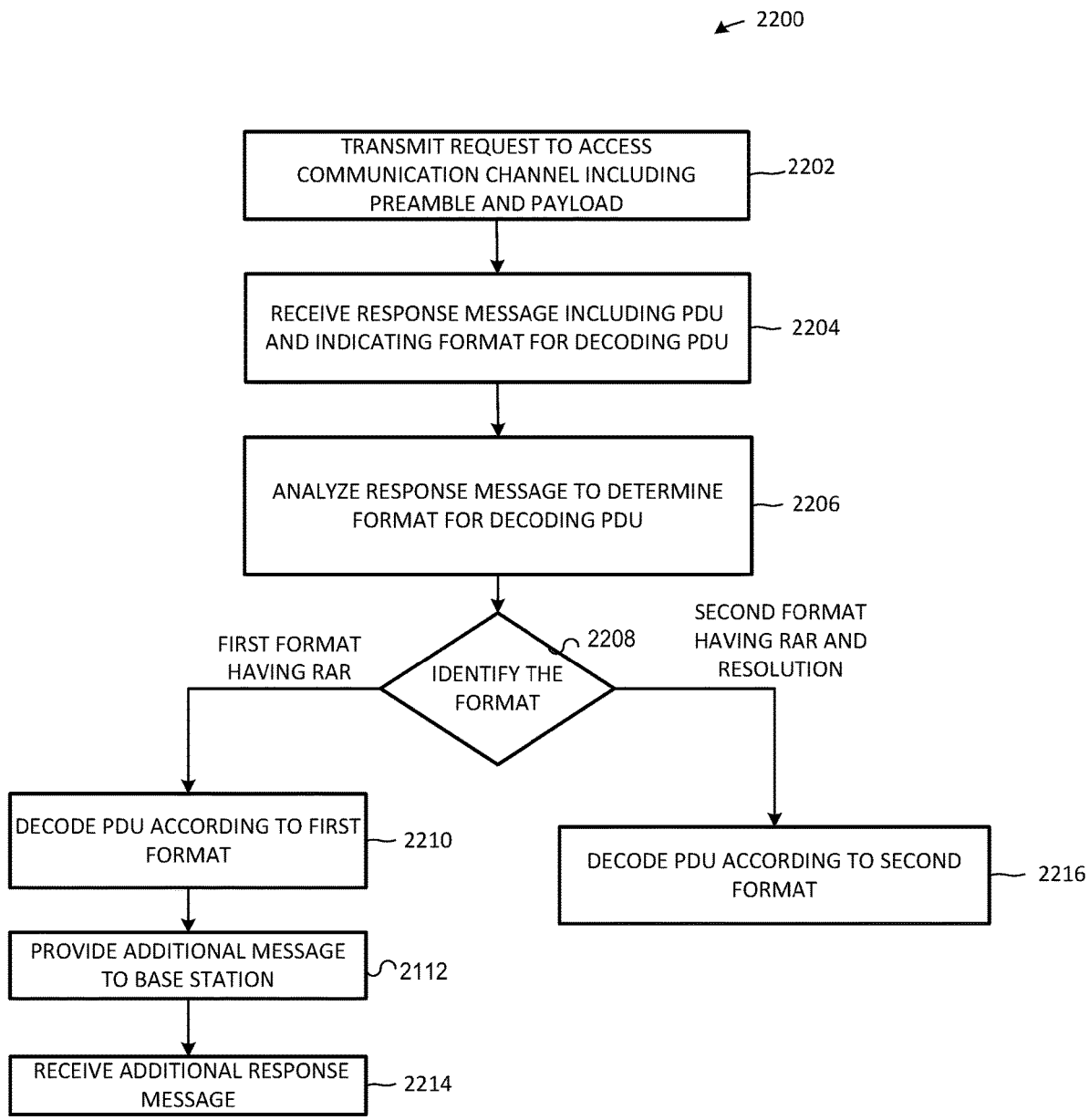
FIG. 22 is a flow diagram of an example method for requesting access to a communication channel, which can be implemented in the user device of FIG. 1.

Referring to FIG. 22, a method 2200 can be implemented in the processing hardware of a UE using hardware, firmware, software, or any suitable combination of hardware, firmware, and software. For convenience, FIG. 22 is discussed below with example reference to the UE 102, in which one or more of the modules 122-126 can implement the method 2200.

The method 2200 begins at block 2202, where the UE 102 transmits, to a base station 104, a request to access a communication channel. The request may be a MsgA having a random access preamble and a payload. As a more specific example, the MsgA can be associated with the transmission 402A of FIG. 4A, transmission 402B of FIG. 4B, transmission 402C of FIG. 4C, transmission 802A of FIG. 8A, transmission 802B of FIG. 8B, transmission 802C of FIG. 8C, transmission 1902A of FIG. 19A, transmission 1902B of FIG. 19B, transmission 1902C of FIG. 19C, transmission 2002A of FIG. 20A, transmission 2002B of FIG. 20B, or transmission 2002C of FIG. 20C.

At block 2204, the UE 102 receives a response message from the base station. The response message may include a DCI and a CRC of the DCI scrambled with an RNTI, and a MAC PDU. The DCI scrambled with the RNTI may be transmitted in a PDCCH while the MAC PDU may be transmitted in a PDSCH. Furthermore, the response message may include an indication of the format of the response message, or more specifically, an indication of the format of the MAC PDU included in the response message. The format of the MAC PDU may be in accordance with whether the payload was successfully decoded by the base station 104. For example, the MAC PDU may be in a first format having an RAR when the payload was not successfully decoded by the base station 104. On the other hand, the MAC PDU may be in a second format having a MsgB (e.g., an RAR and a resolution) when the payload was successfully decoded by the base station 104. As a more specific example, the response message in the first format having an RAR can be associated with the transmissions 420B, 430B of FIG. 4B, transmission 830B of FIG. 8B, transmissions 1920B, 1930B of FIG. 19B, or transmissions 2020B, 2030B of FIG. 20B. The response message in the second format having a MsgB can be associated with the transmissions 420C, 430C of FIG. 4C, transmission 830C of FIG. 8C, transmissions 1920C, 1930C of FIG. 19C, or transmissions 2020C, 2030C of FIG. 20C.

Then at block 2206, the UE 102 analyzes the response message to determine the format of the response message. In the examples above, the UE 102 determines the format of the response message at step 440A of FIG. 4A, step 440B of FIG. 4B, step 440C of FIG. 4C, step 840A of FIG. 8A, step 840B of FIG. 8B, step 840C of FIG. 8C, step 1940A of FIG. 19A, step 1940B of FIG. 19B, step 1940C of FIG. 19C, step 2040A of FIG. 20A, step 2040B of FIG. 20B, or step 2040C of FIG. 20C.

The format of the response message may be indicated in the RNTI which is scrambled with the DCI. If the RNTI is a first RNTI, the UE 102 may determine that the response message and more particularly, the MAC PDU is in the first format having an RAR. If the RNTI is a second RNTI, the UE 102 may determine that the response message and more particularly, the MAC PDU is in a second format having a MsgB.

In another example, the format of the response message may be indicated in the MAC PDU, such as in the MAC subheader. If the MAC PDU includes a first MAC subheader, the UE 102 may determine that the response message and more particularly, the MAC PDU is in the first format having an RAR. If the MAC PDU includes a second MAC subheader, the UE 102 may determine that the response message and more particularly, the MAC PDU is in a second format having a MsgB.

In yet another example, the format of the response message may be indicated by the size of a portion of the response message, such as a size of the MAC PDU. In some implementations, the DCI includes an indication of the size of the MAC PDU. If the size of the MAC PDU is less than a threshold size, the UE 102 may determine that the response message and more particularly, the MAC PDU is in the first format having an RAR. If the size of the MAC PDU is greater than or equal to the threshold size, the UE 102 may determine that the response message and more particularly, the MAC PDU is in a second format having a MsgB.

In another example, the format of the response message may be indicated in the DCI. If the DCI is a first DCI, the UE 102 may determine that the response message and more particularly, the MAC PDU is in the first format having an RAR. If the DCI is a second DCI, the UE 102 may determine that the response message and more particularly, the MAC PDU is in a second format having a MsgB.

If the UE 102 determines that the response message is in the first format having an RAR, at block 2210, the UE 102 decodes the MAC PDU included in the response message according to the first format. In the examples above, the UE 102 decodes the MAC PDU included in the response message according to the first format at step 448B of FIG. 4B, step 842B of FIG. 8B, step 1942B of FIG. 19B, or step 2042B of FIG. 20B.

Then the UE 102 transmits an additional message to the base station 104 including a payload/scheduled transmission (block 2212). As a more specific example, the additional message from the UE 102 can be associated with the transmission 450A of FIG. 4A, transmission 450B of FIG. 4B, transmission 850A of FIG. 8A, transmission 850B of FIG. 8B, transmission 1950A of FIG. 19A, transmission 1950B of FIG. 19B, transmission 2050A of FIG. 20A, or transmission 2050B of FIG. 20B. The UE 102 then receives an additional response message including a resolution from the base station (block 2214). As a more specific example, the additional response message from the base station 104 can be associated with the transmission 452A of FIG. 4A, transmission 452B of FIG. 4B, transmission 852A of FIG. 8A, transmission 852B of FIG. 8B, transmission 1952A of FIG. 19A, transmission 1952B of FIG. 19B, transmission 2052A of FIG. 20A, or transmission 2052B of FIG. 20B.

On the other hand, if the UE 102 determines that the response message is in the second format having a MsgB including an indication of a UL grant, at block 2216, the UE 102 decodes the MAC PDU included in the response message according to the second format. In the examples above, the UE 102 decodes the MAC PDU included in the response message according to the second format at step 444C of FIG. 4C, step 844C of FIG. 8C, step 1944C of FIG. 19C, or step 2064 of FIG. 20C.

Embodiments of the techniques described in the present disclosure may include any number of the following aspects, either alone or combination:

1. A method in a base station for granting access to a communication channel, the method comprising: receiving, by processing hardware at the base station from a user device, a request to access the communication channel, the request including a random access preamble and a payload; attempting to decode, by the processing hardware, the payload; selecting, by the processing hardware, a format of a response message in accordance with whether the payload was decoded successfully; and transmitting, by the processing hardware to the user device, the response message, including providing an indication of the format of the response message to the user device.

2. The method according to aspect 1, wherein providing the indication of the format includes: applying a first identifier of the user device to the response message when the payload was not decoded successfully, in a first instance; and applying a second identifier of the user device to the response message when the payload was decoded successfully, in a second instance.

3. The method according to any of the preceding aspects, wherein: in a first instance, the method further comprises: receiving, by the processing hardware from the user device, an additional message including the payload; and transmitting, by the processing hardware to the user device, an additional response message; and in a second instance, transmitting the response message includes transmitting, by the processing hardware to the user device, the response message including an indication of an uplink grant.

5. The method according to any of the preceding aspects, wherein: scrambling the DCI element with the first identifier includes scrambling a cyclic redundancy check (CRC) of the DCI element with the first identifier; and scrambling the DCI element with the second identifier includes scrambling a CRC of the DCI element with the second identifier.

6. The method according to any of the preceding aspects, wherein: applying the first identifier in the first instance includes applying a first radio network temporary identifier (RNTI) of the user device to the response message when the data was not decoded successfully.

7. The method according to any of the preceding aspects, wherein: applying the second identifier in the second instance includes applying a second RNTI of the user device to the response message when the payload was decoded successfully.

8. The method according to any of the preceding aspects, wherein: applying the first identifier in the first instance includes applying the first identifier indicating a first format of the response message, the first format having a random access response; and applying the second identifier in the second instance includes applying the second identifier indicating a second format of the response message, the second format having the random access response and a resolution.

9. The method according to any of the preceding aspects, wherein the random access response for the first format and the random access response and resolution for the second format are included within a media access control (MAC) layer protocol data unit (PDU), and further comprising: transmitting, by the processing hardware to the user device, the DCI element scrambled with the first or second identifier on a physical downlink control channel (PDCCH); and transmitting, by the processing hardware to the user device, the MAC PDU on a physical data shared channel (PDSCH).

10. The method according to any of the preceding aspects, wherein the request to access the communication channel is a random access channel (RACH) communication, and wherein the first RNTI is associated with a physical random access channel (PRACH) in which the RACH communication is transmitted from the user device.

11. The method according to any of the preceding aspects, wherein the first RNTI=1+s_id+14×t_id+14×80×f_id+14×80×8×ul_carrier_id, wherein: the s_id is an index of a first orthogonal frequency-division multiplexing (OFDM) symbol of the PRACH, the t_id is an index of a first slot of the PRACH in a system frame, the f_id is an index of the first part of the PRACH in a frequency domain, and the ul_carrier_id is an uplink carrier used for transmission of the RACH communication.

12. The method according to any of the preceding aspects, wherein providing the indication of the format includes: transmitting, by the processing hardware to the user device, the response message having a protocol data unit (PDU) including an indicator of the format of the response message to the user device.

13. The method according to any of the preceding aspects, wherein transmitting the response message having a PDU including an indicator of the format of the response message includes: transmitting, by the processing hardware to the user device, the response message having the PDU including a first indicator when the payload was not decoded successfully, in a first instance; and transmitting, by the processing hardware to the user device, the response message having the PDU including a second indicator when the payload was decoded successfully, in a second instance.

14. The method according to any of the preceding aspects, wherein providing the indication of the format includes: transmitting, by the processing hardware to the user device, an indication of a size of a portion of the response message.

15. The method according to any of the preceding aspects, wherein transmitting an indication of a size of a portion of the response message includes: transmitting, by the processing hardware to the user device, an indication of a first size less than a threshold size when the payload was not decoded successfully, in a first instance; and transmitting, by the processing hardware to the user device, an indication of a second size greater than or equal to the threshold size when the payload was decoded successfully, in a second instance.

16. The method according to any of the preceding aspects, wherein transmitting an indication of a size of a portion of the response message includes transmitting, by the processing hardware to the user device, the response message including a downlink control information (DCI) element, the DCI element including an indication of a size of a protocol data unit (PDU) included in the response message.

17. The method according to any of the preceding aspects, wherein providing the indication of the format includes: transmitting, by the processing hardware to the user device, the response message having a downlink control information (DCI) element, the DCI element including an indicator of the format of the response message to the user device.

18. The method according to any of the preceding aspects, wherein transmitting the response message having a DCI element including an indicator of the format of the response message includes: transmitting, by the processing hardware to the user device, the response message having the DCI element, the DCI element including a first indicator when the payload was not decoded successfully, in a first instance; and transmitting, by the processing hardware to the user device, the response message having the DCI element, the DCI element including a second indicator when the payload was decoded successfully, in a second instance.

19. A method in a user device for requesting access to a communication channel, the method comprising: transmitting, by processing hardware at the user device to a base station, a request to access the communication channel, the request including a random access preamble and a payload; receiving, by the processing hardware from the base station, a response message to the request, the response message indicating a format of the response message in accordance with whether the payload was decoded successfully by the base station; determining, by the processing hardware, the format of the response message; and decoding, by the processing hardware, a portion of the response message according to the determined format.

20. The method according to aspect 19, wherein determining the format of the response message includes: in a first instance, determining the response message is in a first format based on an indication of the first format included in the response message; decoding, by the processing hardware, the portion of the response message according to the first format; transmitting, by the processing hardware to the base station, an additional message including the payload; and receiving, by the processing hardware from the base station, an additional response message; and in a second instance, determining the response message is in a second format based on an indication of the second format included in the response message; and decoding, by the processing hardware, the portion of the response message according to the second format, wherein receiving the response message includes receiving, by the processing hardware from the base station, the response message including an indication of an uplink grant.

21. The method according to either one of aspect 19 or aspect 20, wherein decoding a portion of the response message includes decoding, by the processing hardware, a protocol data unit (PDU) according to the determined format.

22. The method according to any of aspects 19-21, wherein determining the format of the response message includes: obtaining a first identifier of the user device from the response message, in the first instance; and obtaining a second identifier of the user device from the response message, in the second instance.

23. The method according to any of aspects 19-22, wherein determining the format of the response message includes: obtaining a first identifier of the user device; attempting to decode a downlink control information (DCI) element in the response message using the first identifier; and in response to determining that the DCI element was decoded successfully, determining that the first identifier indicates that the response message is in the first format.

24. The method according to any of aspects 19-23, wherein determining the format of the response message further includes: in response to determining that the DCI element was not decoded successfully, obtaining a second identifier of the user device; attempting to decode the DCI element in the response message using the second identifier; and in response to determining that the DCI element was decoded successfully, determining that the second identifier indicates that the response message is in the second format.

25. The method according to any of aspects 19-24, wherein: the obtaining the first identifier of the user device includes obtaining a first radio network temporary identifier (RNTI) of the user device from the response message; and obtaining a second identifier of the user device includes obtaining a second RNTI of the user device from the response message.

26. The method according to any of aspects 19-25, wherein transmitting a request to access the communication channel includes transmitting, by the processing hardware at the user device to the base station, a random access channel (RACH) communication, and wherein the obtaining the first RNTI of the user device from the response message includes determining the first RNTI based on characteristics of a physical random access channel (PRACH) in which the RACH communication is transmitted from the user device.

27. The method according to any of aspects 19-26, wherein the obtaining the second RNTI of the user device from the response message includes obtaining the second RNTI from a payload of the RACH communication transmitted from the user device, or determining the second RNTI based on other characteristics of the physical random access channel (PRACH) in which the RACH communication is transmitted from the user device.

28. The method according to any of aspects 19-27, wherein the first RNTI=1+s_id+14×t_id+14×80×f_id+14× 80×8×ul_carrier_id, wherein: the s_id is an index of a first orthogonal frequency-division multiplexing (OFDM) symbol of the PRACH, the t_id is an index of a first slot of the PRACH in a system frame, the f_id is an index of the first part of the PRACH in a frequency domain, and the ul_carrier_id is an uplink carrier used for transmission of the RACH communication.

29. The method according to any of aspects 19-28, wherein determining the format of the response message includes: obtaining an indicator of the format of the response message from a protocol data unit (PDU) in the response message.

30. The method according to any of aspects 19-29, wherein determining the format of the response message includes: obtaining an indication of a size of a portion of the response message; in a first instance, determining that the response message is in a first format in response to determining that the size is less than a threshold size; and in a second instance, determining that the response message is in a second format in response to determining that the size is greater than or equal to the threshold size.

31. The method according to any of aspects 19-30, wherein obtaining an indication of a size of a portion of the response message includes obtaining a downlink control information (DCI) element in the response message, the DCI element including an indication of a size of a protocol data unit (PDU) included in the response message.

32. The method according to any of aspects 19-31, wherein determining the format of the response message includes: obtaining an indicator of the format of the response message from a downlink control information (DCI) element in the response message.

33. A method in a base station for granting access to a communication channel, the method comprising: receiving, by processing hardware at the base station from a user device, a request to access the communication channel, the request including a random access preamble and a payload; attempting to decode, by the processing hardware, the payload; selecting, by the processing hardware, a format of a response message in accordance with whether the payload was decoded successfully; and transmitting, by the processing hardware to the user device, the response message, including providing an indication of the format of the response message to the user device by at least one of: (i) applying a first identifier of the user device to the response message when the payload was not decoded successfully, in a first instance, and applying a second identifier of the user device to the response message when the payload was decoded successfully, in a second instance, (ii) transmitting an indication of a size of a portion of the response message, or (iii) transmitting the response message having a downlink control information (DCI) including an indicator of the format of the response message to the user device.

34. The method according to aspect 33, wherein applying the first identifier in the first instance, includes: applying a first radio network temporary identifier (RNTI) of the user device to the response message.

35. The method according to either one of aspect 33 or aspect 34, wherein applying the second identifier in the second instance, includes: applying a second RNTI of the user device to the response message.

36. The method according to any of aspects 33-35, wherein the request to access the communication channel is a random access channel (RACH) communication, and wherein the first RNTI is associated with a physical random access channel (PRACH) in which the RACH communication is transmitted from the user device.

37. The method according to any of aspects 33-36, wherein: applying the first identifier in the first instance includes applying the first identifier indicating a first format of the response message, the first format having a random access response; and applying the second identifier in the second instance includes applying the second identifier indicating a second format of the response message, the second format having the random access response and a resolution.

38. The method according to any of aspects 33-37, wherein the random access response for the first format and the random access response and resolution for the second format are included within a media access control (MAC) layer protocol data unit (PDU), and further comprising: transmitting, by the processing hardware to the user device, the DCI element scrambled with the first or second identifier on a physical downlink control channel (PDCCH); and transmitting, by the processing hardware to the user device, the MAC PDU on a physical data shared channel (PDSCH).

39. The method according to any of aspects 33-38, wherein transmitting the indication of the size of the portion of the response message includes: transmitting, by the processing hardware to the user device, an indication of a first size less than a threshold size when the payload was not decoded successfully, in a third instance; and transmitting, by the processing hardware to the user device, an indication of a second size greater than or equal to the threshold size when the payload was decoded successfully, in a fourth instance.

40. The method according to any of aspects 33-39, wherein transmitting the indication of the size of the portion of the response message includes transmitting, by the processing hardware to the user device, the response message including the DCI element, the DCI element including an indication of a size of a protocol data unit (PDU) included in the response message.

41. The method according to any of aspects 33-40, wherein transmitting the response message having the DCI element including an indicator of the format of the response message includes: transmitting, by the processing hardware to the user device, the response message having the DCI element, the DCI element including a first indicator when the payload was not decoded successfully, in a fifth instance; and transmitting, by the processing hardware to the user device, the response message having the DCI element, the DCI element including a second indicator when the payload was decoded successfully, in a sixth instance.

42. The method according to any of aspects 33-41, wherein: in a seventh instance, the method further comprises: receiving, by the processing hardware from the user device, an additional message including the payload; and transmitting, by the processing hardware to the user device, an additional response message; and in an eighth instance, transmitting the response message includes transmitting, by the processing hardware to the user device, the response message including an indication of an uplink grant.

43. A base station comprising processing hardware configured to implement a method of any of aspects 33-42.

44. A method in a user device for requesting access to a communication channel, the method comprising: transmitting, by processing hardware at the user device to a base station, a request to access the communication channel, the request including a random access preamble and a payload; receiving, by the processing hardware from the base station, a response message to the request, the response message indicating a format of the response message in accordance with whether the payload was decoded successfully by the base station; determining, by the processing hardware, the format of the response message based on at least one of: a first identifier of the user device and a second identifier of the user device as applied to the response message, an indication of a size of a portion of the response message, or an indicator of the format of the response message from a downlink control information (DCI) element in the response message; and decoding, by the processing hardware, a portion of the response message according to the determined format.

45. The method according to aspect 44, wherein determining the format of the response message includes: in a first instance, determining the response message is in a first format based on an indication of the first format included in the response message; decoding, by the processing hardware, the portion of the response message according to the first format; transmitting, by the processing hardware to the base station, an additional message including the payload; and receiving, by the processing hardware from the base station, an additional response message; and in a second instance, determining the response message is in a second format based on an indication of the second format included in the response message; and decoding, by the processing hardware, the portion of the response message according to the second format, wherein receiving the response message includes receiving, by the processing hardware from the base station, the response message including an indication of an uplink grant 46. The method according to either one of aspect 44 or aspect 45, wherein determining the format of the response message based on the first identifier of the user device and the second identifier of the user device includes: obtaining the first identifier of the user device; attempting to decode the DCI element in the response message using the first identifier; in a third instance, in response to determining that the DCI element was decoded successfully using the first identifier: determining that the first identifier indicates that the response message is in the first format; and in a fourth instance, in response to determining that the DCI element was not decoded successfully using the first identifier: obtaining the second identifier of the user device; attempting to decode the DCI element in the response message using the second identifier; and in response to determining that the DCI element was decoded successfully using the second identifier, determining that the second identifier indicates that the response message is in the second format.

47. The method according to any of aspects 44-46, wherein: obtaining the first identifier of the user device includes obtaining a first radio network temporary identifier (RNTI) of the user device from the response message; and obtaining the second identifier of the user device includes obtaining a second RNTI of the user device from the response message.

48. The method according to any of aspects 44-47, wherein transmitting a request to access the communication channel includes transmitting, by the processing hardware at the user device to the base station, a random access channel (RACH) communication, and wherein obtaining the first RNTI of the user device from the response message includes determining the first RNTI based on characteristics of a physical random access channel (PRACH) in which the RACH communication is transmitted from the user device.

49. The method according to any of aspects 44-48, wherein obtaining the second RNTI of the user device from the response message includes obtaining the second RNTI from a payload of the RACH communication transmitted from the user device, or determining the second RNTI based on other characteristics of the PRACH in which the RACH communication is transmitted from the user device.

50. The method according to any of aspects 44-49, wherein determining the format of the response message based on the indication of the size of the portion of the response message includes: obtaining the indication of the size of the portion of the response message; in a fifth instance, determining that the response message is in a first format in response to determining that the size is less than a threshold size; and in a sixth instance, determining that the response message is in a second format in response to determining that the size is greater than or equal to the threshold size.

51. The method according to any of aspects 44-50, wherein obtaining the indication of the size of the portion of the response message includes obtaining the DCI element in the response message, the DCI element including an indication of a size of a protocol data unit (PDU) included in the response message.

52. A user device comprising processing hardware configured to implement a method of any of aspects 44-51.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for handling channel access procedures through the disclosed principles herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method in a base station for granting access to a communication channel, the method comprising:
   receiving, at the base station from a user device, a request to access the communication channel, the request including a random access preamble and a payload;
   attempting to decode the payload;
   in a first instance when the data payload was not successfully decoded:
      generating a first response message including a first protocol data unit (PDU) having a first subheader in a first subheader format including extension (E), type (T), and random access preamble identifier (RAPID) fields, the first subheader format indicating a four-step random access channel (RACH) procedure; and
      transmitting, to the user device, the first response message;
   in a second instance when the data payload was successfully decoded:
      generating a second response message including a second PDU having a second subheader in a second subheader format different from the first subheader format and including a reserved (R) field, the second subheader format indicating a two-step RACH procedure; and
      transmitting, to the user device, the second response message.

2. The method of claim 1, wherein:
   in the first instance, the method further comprises:
   receiving, from the user device, an additional message including the payload; and
   transmitting, to the user device, an additional response message; and
   in the second instance, transmitting the second response message includes transmitting, to the user device, the second response message including an indication of an uplink grant.

3. The method of claim 1, wherein generating the first response in the first instance includes:
   generating the first response message including a random access response (RAR) as a Msg2 in the four-step RACH procedure.

4. The method of claim 1, wherein generating the second response in the second instance includes:
   generating the second response message including an RAR and a contention resolution as a MsgB in the two-step RACH procedure.

5. The method of claim 1, further comprising:
   generating a radio network temporary identifier (RNTI);
   generating a downlink control information (DCI) element;
   generating a cyclic redundancy check (CRC) of the DCI element; and
   transmitting, to the user device on a physical downlink control channel (PDCCH), the DCI and the CRC scrambled with the RNTI; and
   transmitting, to the user device on a physical data shared channel (PDSCH), the first or second PDU.

6. A base station comprising processing hardware configured to:
   receive, from a user device, a request to access the communication channel, the request including a random access preamble and a payload;
   attempt to decode the payload;
   in a first instance when the data payload was not successfully decoded:
      generate a first response message including a first protocol data unit (PDU) having a first subheader in a first subheader format including extension (E), type (T), and random access preamble identifier (RAPID) fields, the first subheader format indicating a four-step random access channel (RACH) procedure; and
      transmit, to the user device, the first response message;
   in a second instance when the data payload was successfully decoded:
      generate a second response message including a second PDU having a second subheader in a second subheader format different from the first subheader format and including a reserved (R) field, the second subheader format indicating a two-step RACH procedure; and transmit, to the user device, the second response message.

7. The base station of claim 6, wherein:

in the first instance, the base station is further configured to:

receive, from the user device, an additional message including the payload; and transmit, to the user device, an additional response message; and in the second instance, transmit, to the user device, the second response message including an indication of an uplink grant.

8. The base station of claim 6, wherein to generate the first response in the first instance, the base station is configured to:

generate the first response message including a random access response (RAR) as a Msg2 in the four-step RACH procedure.

9. The base station of claim 6, wherein to generate the second response in the second instance, the base station is configured to:

generate the second response message including an RAR and a contention resolution as a MsgB in the two-step RACH procedure.

10. The base station of claim 6, wherein the base station is further configured to:

generate a radio network temporary identifier (RNTI);

generate a downlink control information (DCI) element;

generate a cyclic redundancy check (CRC) of the DCI element; and transmit, to the user device on a physical downlink control channel (PDCCH), the DCI and the CRC scrambled with the RNTI; and transmit, to the user device on a physical data shared channel (PDSCH), the first or second PDU.

11. A method in a user device for requesting access to a communication channel, the method comprising:

transmitting, to a base station, a request to access the communication channel, the request including a random access preamble and a payload;

receiving, from the base station, a response message to the request, the response message indicating a format of the response message in accordance with whether the payload was decoded successfully by the base station;

in a first instance, determining the response message is in a first format indicating a four-step random access channel (RACH) procedure based on a subheader of a protocol data unit (PDU) including a first subheader format in the response message indicating that the payload was not successfully decoded, the first subheader format including extension (E), type (T), and random access preamble identifier (RAPID) fields;

decoding a portion of the response message according to the first format;

transmitting, to the base station, an additional message including the payload; and receiving, from the base station, an additional response message; and in a second instance, determining the response message is in a second format indicating a two-step random access channel (RACH) procedure based on the subheader including a second subheader format in the response message indicating that the payload was successfully decoded, the second subheader format including a reserved (R) field; and decoding the portion of the response message according to the second format.

12. The method of claim 11, wherein receiving the response message includes receiving, from the base station, the response message including an indication of an uplink grant.

13. The method of claim 12, wherein in the first instance, decoding the portion of the response message includes decoding a random access response (RAR) in the response message according to a Msg2 format in the four-step RACH procedure; and wherein transmitting an additional message includes transmitting the payload as a Msg3 in the four-step RACH procedure.

14. The method of claim 12, wherein in the second instance, decoding the response message includes decoding an RAR and a contention resolution in the response message according to a MsgB format in the two-step RACH procedure.

* * * * *